US011466981B2

(12) United States Patent
Mambrilla et al.

(10) Patent No.: US 11,466,981 B2
(45) Date of Patent: Oct. 11, 2022

(54) WHEEL ALIGNMENT DETERMINATION AND ADJUSTMENT

(71) Applicant: Space S.R.L., Trana (IT)

(72) Inventors: Massimo Mambrilla, Scalenghe (IT); Alberto Gasperini, San Lazzaro di Savena (IT); Giampiero Massa, Chieri (IT)

(73) Assignee: Space S.R.L., Trana (IT)

( * ) Notice: Subject to any disclaimer, the term of this patent is extended or adjusted under 35 U.S.C. 154(b) by 160 days.

(21) Appl. No.: 16/925,527

(22) Filed: Jul. 10, 2020

(65) Prior Publication Data

US 2021/0025701 A1 Jan. 28, 2021

(30) Foreign Application Priority Data

Jul. 12, 2019 (IT) .......................... 202019000002295
Feb. 17, 2020 (EP) ...................................... 20157753

(51) Int. Cl.
*G01B 11/275* (2006.01)

(52) U.S. Cl.
CPC ...... *G01B 11/275* (2013.01); *G01B 2210/143* (2013.01); *G01B 2210/30* (2013.01)

(58) Field of Classification Search
CPC .............. G01B 11/275; G01B 2210/30; G01B 2210/143; G01B 2210/58; G01B 11/2755
USPC ................................................... 356/139.09
See application file for complete search history.

(56) References Cited

U.S. PATENT DOCUMENTS 10,473,458 B2 * 11/2019 Rogers ................... H04N 7/181

FOREIGN PATENT DOCUMENTS

| WO | WO2011138662 A1 | 11/2011 |
|----|-----------------|---------|
| WO | WO2015136499 A1 | 9/2015 |
| WO | WO2018215924 A1 | 11/2018 |

* cited by examiner

*Primary Examiner* — Daniel L Murphy
(74) *Attorney, Agent, or Firm* — Fish & Richardson P.C.

(57) ABSTRACT

System for diagnosing the wheel alignment of a vehicle includes a measuring device configured to measure a characteristic parameter of the wheel alignment, wherein the measuring device comprises a wireless communication device to remotely transmit a signal related to the characteristic parameter. The system further comprises a portable remote device, distinct and separate from the measuring device, having a wireless communication device to remotely receive the signal related to the measured characteristic parameter, and a control unit adapted to receive the related signal from the wireless communication device and to carry out a step of processing the signal to derive a value of the characteristic parameter. The portable remote device further has a screen to display a characteristic information representative of the value of the characteristic parameter, and a battery connected to the wireless communication device, to the control unit and to the screen to allow their respective operation.

19 Claims, 8 Drawing Sheets

FIG.2
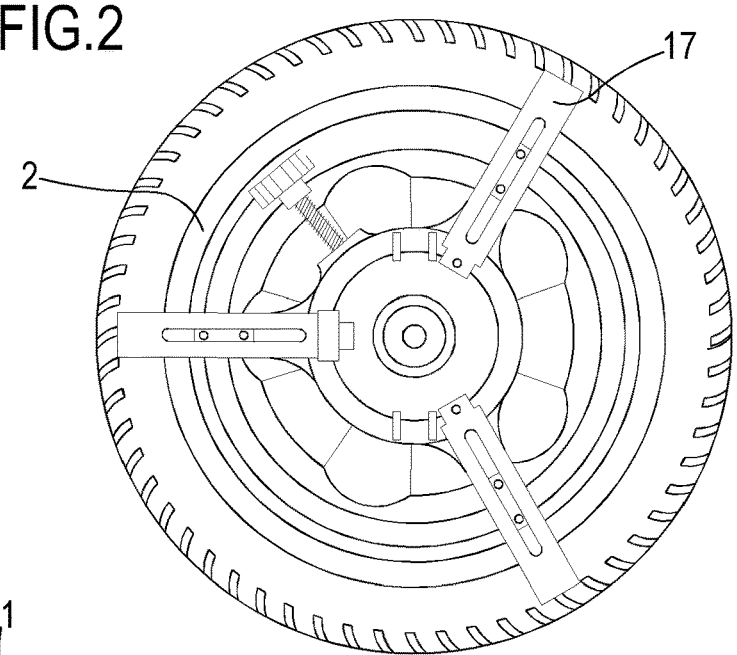
FIG.3
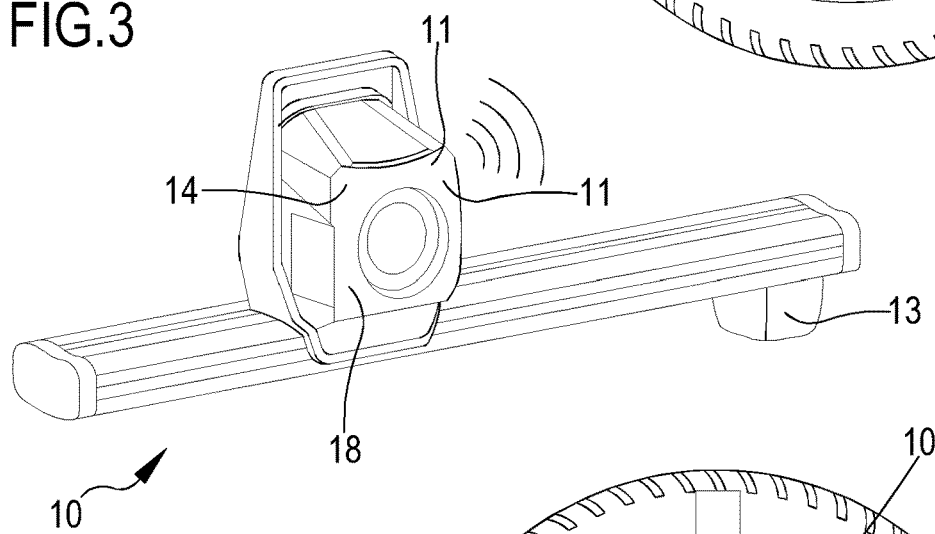
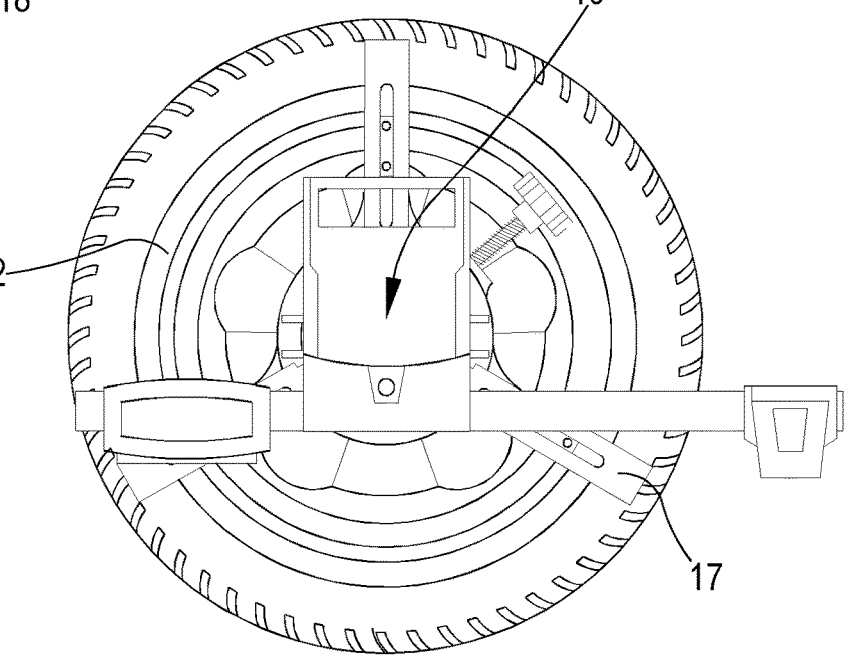
FIG.4

| | | | | | | | | |
|---|---|---|---|---|---|---|---|---|
| REF | | | | | | | | |
| →☐← | ± | △ | | (FA) | | ☐← ☐ →☐ | | △ |
| -1.12 | -1.12 | 1.12 | | TT | | -3.80 | | |
| -0.56 | -0.56 | 0.56 | | PT | | -6.40 | +2.60 | |
| -0.23° | -0.23° | 1.00° | --- | CAM | | -1.06° | -0.92° | -0.14 |
| +5.00° | +5.00° | 1.00° | --- | CAS | | +0.30° | -1.05° | +1.35 |
| +11.00° | +11.00° | 0.60° | | KP | | +4.45° | +4.23° | |
| +10.77° | +10.77° | --- | | IA | | +3.39° | +3.31° | |
| | | | | (RA) | | | | |
| +2.18 | +2.18 | 1.65 | | TT | | +1.30 | | |
| +1.09 | +1.09 | 0.83 | | PT | | +3.40 | -2.10 | |
| -0.83° | -0.83° | 0.33° | --- | CAM | | +0.52° | +0.03° | +0.49° |
| +0.00° | +0.00° | 0.25° | | TA | | +0.42° | | |

WHEEL ALIGNMENT DETERMINATION AND ADJUSTMENT

CROSS-REFERENCE TO RELATED APPLICATIONS

This application claims priority under 35 U.S.C. § 119 to Italian Patent Application No. 202019000002295, filed on Jul. 12, 2019 and European Patent Application No. 20157753.3, filed on Feb. 17, 2020, the entire contents of each of which are incorporated herein by reference.

TECHNICAL FIELD

The present invention relates to determining the wheel alignment of a ground vehicle, for example of an automobile or a truck, and to adjusting the wheel alignment.

BACKGROUND

In the vehicle sector, systems directed at the measurement of characteristic parameters of the wheel alignment are known: these characteristic parameters are an integral part of the kinematics of the suspension of the vehicle, substantially influencing the motion dynamics of the vehicle. Therefore, the correct setting of such characteristic parameters of the wheel alignment defines an essential requirement for safety purposes. Known in the art are systems for measuring the values of these characteristic parameters of the wheel alignment of a vehicle, for example the toe angle, the camber angle, the thrust angle, the tilt of the kingpin and the included angle.

The measurement of these wheel alignment angles is commonly carried out by placing measuring devices securely anchored to the wheels of the vehicle: the measuring devices comprise optical sensors configured to measure mutual distances between each of the measuring devices and/or a characteristic angle. The information obtained by the measuring devices is then transmitted to a fixed analysis station, comprising a fixed computer (desktop computer) and a graphic interface (Monitor), configured to receive this information, process it and display it to allow an operator to verify whether or not the values of the characteristic parameters of the attitude of the car are correct. If it is detected that one or more value of the characteristic parameters of the wheel alignment exceeds a predefined tolerance range, specific for the model of the vehicle being examined, the operator has the task of acting mechanically on the geometry of the suspensions of the vehicle, until the complete restoration of the correct characteristic angles of the vehicle. For each mechanical modification to the geometry of the suspensions, the operator has to verify in real time on the monitor of the fixed station the value of the characteristic angles measured by the measuring devices, to ascertain that the wheel alignment adjustments made are directed towards the predefined tolerance range. The operator thus has to operate at the car on the wheel alignment of the car to introduce an adjustment, go back to the fixed analysis station for reviewing the wheel alignment changes following each introduced adjustment, and again return to the car to finalize the adjustment operations on the wheel alignment: this procedure is iteratively repeated until all characteristic angles of the wheel alignment of the vehicle are returned within their respective tolerance ranges.

This diagnosis system has considerable disadvantages, because it forces the operator to constantly move back and forth between the car and the analysis station, entailing a waste of time and difficulties in the execution of the adjustment phases. It should also be taken into account that very often a change to a mechanical element of the suspension, for example a change to the length of the steering rod to change the camber angle of a wheel, has an influence on other characteristic parameters of the wheel alignment, for example on the camber angle of that wheel. The operator is thus compelled to frequently move from the point where (s)he has to carry out the mechanical adjustment operations on the vehicle, to the fixed analysis station, in order to realize what changes in terms of wheel alignment angles have been caused by each mechanical operation performed.

SUMMARY

Aspects of the new solution are disclosed herein below. A $1^{st}$ aspect concerns a diagnosis system (100) for diagnosing the wheel alignment of a vehicle (1), said system comprising:
  at least one measuring device (10) configured to measure
    at least one characteristic parameter of the wheel alignment of the vehicle (1) or of a respective wheel (2), said at least one measuring device (10) further comprising a wireless communication device (12) configured to remotely transmit a signal related to said at least one characteristic parameter;
  at least one portable remote device (20), physically separated from said measuring device (10), comprising:
    a further wireless communication device (22) configured to remotely receive said signal related to the at least one characteristic parameter measured by the at least one measuring device (10);
    a control unit (21) configured to:
      receive from the further wireless communication device (22) said signal related to the at least one characteristic parameter,
      carry out at least one step of processing said signal to obtain a value of said at least one characteristic parameter;
    at least one screen (23), controlled by the control unit (21), to display at least one characteristic information item, representative of the value of said at least one characteristic parameter;
    at least one battery (24) supplying power at least to the further wireless communication device (22), the control unit (21) and the screen (23) to allow their respective operation.

In a $2^{nd}$ aspect according to the preceding aspect the measuring device (10) comprises, for each side of the vehicle (1), at least one among:
  a camera, borne by a fixed structure, and at least one optical target, mounted on a wheel (2), said signal being related to at least one image of said optical target obtained by said camera,
  a camera, borne by a fixed structure, said signal being related to at least one image obtained by a camera and related to a wheel (2),
  an inclination sensor mounted on a wheel (2), said signal being related to at least one angle of inclination measured by the inclination sensor with respect to a reference direction.

In a $3^{rd}$ aspect according to any one of the preceding aspects the control unit (21) of the portable remote device (20) is configured to process said signal, obtain the value of the at least one characteristic parameter measured by the measuring device (10), define said at least one characteristic information item and command the display of said characteristic information item on said screen (23).

In a 4th aspect according to any one of the preceding aspects said characteristic information item comprises at least one among: a numerical representation of the value of the at least one characteristic parameter, a chromatic indication representative of the value of the at least one characteristic parameter, a schematic image of the vehicle (1) representative of the value of the at least one characteristic parameter, a schematic image of at least one respective wheel (2) representative of the value of the at least one characteristic parameter.

In a 5th aspect according to any one of the preceding aspects, the diagnosis system (100) comprises at least a first and a second measuring device (10) each configured to send respectively at least a first and a second signal related to said at least one characteristic parameter, the control unit (21) of the portable remote device being configured to process in combination said first and second signal to obtain the value of said at least one characteristic parameter.

In a 6th aspect according to any one of the preceding aspects said characteristic parameter comprises at least one among:
 a toe angle of at least one wheel (2) of the vehicle (1);
 a camber angle of at least one wheel (2) of the vehicle (1);
 a caster angle of at least one wheel (2) of the vehicle (1);
 a thrust angle of the vehicle (1);
 an included angle;
 an angle representative of a tilt of the kingpin of the vehicle (1).

In a 7th aspect according to any one of the preceding aspects the control unit (21) of the portable remote device (20) is configured to:
 receive at least one reference value for each characteristic parameter of the wheel alignment of the vehicle (1),
 compare the obtained value of the at least one characteristic parameter of the wheel alignment of the vehicle (1) with the at least one corresponding reference value.

In an 8th aspect according to any one of the preceding aspects the control unit (21) of the portable remote device (20) is configured to carry out, as a function of said comparison, the step of displaying on the at least one screen (23) of the portable remote device (20) the characteristic information item, said step of displaying comprising displaying a chromatic or figurative indication, representative of at least one among:
 a difference between the at least one obtained value of the characteristic parameter of the wheel alignment of the vehicle (1) and the respective reference value,
 a change of said difference over time,
 a ratio between the at least one obtained value of the characteristic parameter of the wheel alignment of the vehicle (1) and the respective reference value, and
 a change of said ratio over time.

In a 9th aspect according to any one of the preceding aspects the control unit (21) of the remote device is configured to change a visually perceivable property, optionally one or more of the color, the tonality, the shape, the size, the contour, of said chromatic or figurative indication as the difference between the obtained value of the characteristic parameter of the wheel alignment of the vehicle (1) and the corresponding reference value decreases or as the ratio between the obtained value of the characteristic parameter of the wheel alignment of the vehicle (1) and the corresponding reference value tends to 1.

In a 10th aspect according to any one of the preceding aspects the control unit (21) of the remote device is configured to accentuate a visually perceivable property, optionally to increase the intensity of the color, or the tonality or to increase the size, or to mark-up the contour, of said chromatic or figurative indication if the change of said difference over time is representative of a reduction of said difference, or the change of said ratio over time is representative of a trend to 1 of said ratio.

In an 11th aspect according to any one of the preceding aspects the portable remote device (20) comprises at least one loudspeaker (25), the control unit (21) of the portable remote device (20) being configured to command, as a function of said comparison, said loudspeaker (25) to emit at least one audible sound signal, said sound signal being representative of at least among:
 a difference between the at least one obtained value of the characteristic parameter of the wheel alignment of the vehicle (1) and the respective reference value,
 a change of said difference over time,
 a ratio between the at least one obtained value of the characteristic parameter of the wheel alignment of the vehicle (1) and the respective reference value, and
 a change of said ratio over time.

In a 12th aspect according to any one of the preceding aspects the control unit (21) of the portable remote device (20) is configured to increase a frequency or volume of the sound signal as the difference between the obtained value of the characteristic parameter of the wheel alignment of the vehicle (1) and the corresponding reference value decreases or as the ratio between the obtained value of the characteristic parameter of the wheel alignment of the vehicle (1) and the corresponding reference value tends to 1.

In a 13th aspect according to any one of the preceding aspects the control unit (21) of the portable remote device is configured to increase a frequency or volume of the sound signal if the change of said difference over time is representative of a reduction of said difference, or if the change of said ratio over time is representative of a trend to 1 of said ratio.

In a 14th aspect according to any one of the preceding aspects the portable remote device (20) comprises at least one vibrodine (26), the control unit (21) of the portable remote device (20) being configured to command, as a function of said comparison, said vibrodine (26) to emit at least one vibrational signal, said vibrational signal being representative of at least among:
 a difference between the at least one obtained value of the characteristic parameter of the wheel alignment of the vehicle (1) and the respective reference value,
 a change of said difference over time,
 a ratio between the at least one obtained value of the characteristic parameter of the wheel alignment of the vehicle (1) and the respective reference value, and
 a change of said ratio over time.

In a 15th aspect according to any one of the preceding aspects the control unit (21) of the remote device is configured to increase a frequency or amplitude of the vibrational signal as the difference between the obtained value of the characteristic parameter of the wheel alignment of the vehicle (1) and the corresponding reference value decreases or as the ratio between the obtained value of the characteristic parameter of the wheel alignment of the vehicle (1) and the corresponding reference value tends to 1.

In a 16th aspect according to any one of the preceding aspects the control unit (21) of the remote device is configured to increase a frequency or amplitude of the vibrational signal if the change of said difference over time is representative of a reduction of said difference, or the change of said ratio over time is representative of a trend to 1 of said ratio.

In a 17$^{th}$ aspect according to any one of the preceding aspects the portable remote device (20) is at least one among a portable computer, a tablet or a smartphone.

In an 18$^{th}$ aspect according to any one of the preceding aspects the portable remote device (20) is a device that can be worn on the head of an operator (203) comprising:
  a frame for eyeglasses carrying the control unit (21), the further wireless communication device (22) and the battery (24) of the portable remote device (20);
  one or more lenses, in particular transparent, polarized or prescription lenses, mounted on said frame to define at least partially said screen (23) of the portable remote device (20).

In a 19$^{th}$ aspect according to any one of the preceding aspects said screen (23) has dimensions between 4" and 15", in particular between 5" and 12".

In a 20$^{th}$ aspect according to any one of the preceding aspects said screen (23) is a touch screen.

In a 21$^{st}$ aspect according to any one of the preceding aspects the portable remote device (20) has a weight between 60 g and 1500 g, in particular between 90 g and 700 g, yet more in particular between 100 g and 400 g.

In a 22$^{nd}$ aspect according to any one of the preceding aspects the portable remote device (20) comprises at least one support base of said screen and at least one magnetic or magnetizable structure fastened to said support base and configured to allow the removable engagement of the remote device to a metallic structure (202).

In a 23$^{rd}$ aspect according to the preceding aspect the magnetic or magnetizable structure of the portable remote device support base comprises at least one layer of magnetic or magnetizable material externally fastened to the support base, at the opposite side with respect to said screen (23), said magnetic or magnetizable structure covering a preponderant part of said support base, optionally the entire support base.

In a 24$^{th}$ aspect according to any one of the preceding aspects the portable remote device (20) comprises at least one inclinometer connected with the control unit (21) and configured to measure an inclination of the portable remote device (20), the control unit (21) being in addition configured to determine an orientation of the characteristic information item displayed on the screen (23) as a function of the inclination of the portable remote device (20).

In a 25$^{th}$ aspect according to any one of the preceding aspects the system includes two or more measuring devices (10) wherein each measuring device (10) is configured to measure at least one characteristic parameter of the alignment of the vehicle (1) or of a respective wheel (2).

In a 26$^{th}$ aspect according to any one of the preceding aspects the system comprises at least four measuring devices of which two for each axle of the vehicle (1), wherein each measuring device (10) is configured to measure at least one characteristic parameter of the alignment of the vehicle (1) or of a respective wheel (2).

In a 27$^{th}$ aspect according to any one of the preceding aspects the system comprises two or more measuring devices (10) wherein each measuring device (10) is configured to measure two or more characteristic parameters of the alignment of the vehicle (1) or of a respective wheel (2).

In a 28$^{th}$ aspect according to any one of the preceding aspects the system comprises an auxiliary remote device (30), separate and distinct from the portable remote device (20) and from the at least one measuring device (10), the auxiliary remote device (30) being wearable by an operator (203),
  wherein said auxiliary remote device (30) comprises at least one respective wireless communication device (32) configured to remotely communicate with at least one among the portable remote device (20), the at least one measuring device (10) and optionally a fixed remote device, for example a desktop computer.

In a 29$^{th}$ aspect according to the preceding aspect said auxiliary remote device (30) is wearable at the wrist of an operator (203), optionally said auxiliary remote device (30) being a smartwatch or an electronic bracelet.

In a 30$^{th}$ aspect according to any one of the preceding two aspects the auxiliary remote device (30) is configured to remotely receive, from the portable remote device (20) and/or from the at least one measurement device (10), the at least one value of the characteristic parameter or the signal related to the characteristic parameter of the wheel alignment of the vehicle (1).

In a 31$^{st}$ aspect according to any one of the preceding three aspects the auxiliary remote device (30) comprises:
  an auxiliary control unit (31) connected operatively with the respective wireless communication device (32);
  at least one battery (34);
  at least one between a loudspeaker (35), a vibrodine (36) and one screen (33) configured to display at least one value of the at least one parameter of the wheel alignment of the vehicle (1).

In a 32$^{nd}$ aspect according to the preceding aspect the auxiliary remote device (30) comprises at least one between a loudspeaker (35) and a vibrodine (36), the auxiliary control unit (31) being configured to change at least one between a value of intensity and frequency of the sound signal emitted by the loudspeaker (35) of the auxiliary remote device (30) and/or of the vibrational signal emitted by the vibrodine (36) of the auxiliary remote device (30) as a function of at least one among:
  a difference between the at least one obtained value of the characteristic parameter of the wheel alignment of the vehicle (1) and the respective reference value,
  a change of said difference over time,
  a ratio between the at least one obtained value of the characteristic parameter of the wheel alignment of the vehicle (1) and the respective reference value, and
  a change of said ratio over time.

In a 33$^{rd}$ aspect according to any one of the preceding two aspects, the auxiliary control unit (31) is configured to receive said at least one reference value and to implement a step of comparing the obtained value of the characteristic parameter and said reference value.

In a 34$^{th}$ aspect according to any one of the preceding six aspects the auxiliary remote device (30) comprises at least one screen (33) configured to display at least one between a numerical and chromatic indication representative of the at least one value of the characteristic parameter of the wheel alignment, and a schematic figurative representation of the vehicle (1) or of a respective wheel (2) representative of the at least one measured characteristic parameter.

In a 35$^{th}$ aspect according to any one of the preceding seven aspects the portable remote device (20) is configured to send a command, as a function of the at least one value of the characteristic parameter of the wheel alignment of the vehicle (1) and/or of a difference thereof with respect to a respective reference value and/or of a ratio thereof with respect to a respective reference value, to the auxiliary remote device (30).

In a 36th aspect according to the preceding aspect, said command comprises at least one among:
  a command to emit a sound signal, in particular variable in intensity and frequency as a function of the characteristic parameter or information of the wheel alignment;
  a command to emit a vibrational signal, in particular variable in intensity and frequency as a function of the characteristic parameter or information of the wheel alignment;
  a command to emit a visual signal on the screen (33) comprising at least one numerical, chromatic or figurative indication, representative of the at least one characteristic parameter of the wheel alignment.

In a 37th aspect according to any one of the preceding aspects the system comprises at least one wall-mounted support (40) configured to be fastened to a wall of a work area and to bear the at least one measuring device (10) during a stand-by condition, in particular two or more measuring devices,
said wall-mounted support (40) comprising a power supply circuit comprising:
  a power supply plug (41) configured to be connected to the electrical grid of the work area,
  one or more charging stations electrically connected to the power supply plug (41); the at least one measuring device (10), at least when the latter is borne by the wall-mounted support (40), being configured to connect operatively to said one or more charging stations to determine the charging of a battery (14) of the measuring device (10) itself.

In a 38th aspect according to the preceding aspect the wall-mounted support (40) and the at least one measuring device (10) comprise engaging means configured to allow their mutual coupling, said engaging means comprising at least one between a support bracket and a magnet.

In a 39th aspect according to any one of the preceding two aspects the wall-mounted support (40) is configured to bear the portable remote device (20) and/or the auxiliary remote device (30) during their stand-by condition, in said condition the portable remote device (20) and/or the auxiliary remote device (30) being configured to connect operatively to said one or more charging stations to determine the charging of their respective own battery (24, 34).

In a 40th aspect according to any one of the preceding three aspects the wall-mounted support (40) and at least one between the portable remote device (20) and the auxiliary remote device (30) comprise engaging means configured to allow their mutual coupling, said engaging means comprising at least one between a support bracket and a magnet.

In a 41st aspect according to any one of the preceding four aspects said one or more charging stations of the wall-mounted support (40) comprise a charging plug configured to be connected to a charging cable, or comprise an induction charging base.

In a 42nd aspect according to any one of the preceding five aspects said one or more charging stations of the wall-mounted support (40) comprise an induction charging base configured to supply power, during the stand-by condition, to at least one among the measuring device (10), the portable remote device (20) and/or the optional auxiliary remote device (30).

In a 43rd aspect according to any one of the preceding six aspects the at least one wall-mounted support (40) comprises a first and a second wall-mounted support (40', 40") distinct and separate from each other and configured to be fastened each to a wall of the work area, in particular in which the first and the second wall-mounted support (40' 40") are each configured to bear two measuring devices.

In a 44th aspect according to any one of the preceding aspects the system includes a wireless access point connected electrically to the power supply circuit and configured to wirelessly connect to at least one measuring device (10) and to the remote device and/or to the auxiliary remote device (30).

In a 45th aspect according to any one of the preceding aspects each measuring device (10) comprises:
  a local control unit (11) connected with one respective wireless communication device (12);
  at least one battery (14) electrically connected at least to the local control unit (11) and to the respective wireless communication device (12) to allow their respective operation.

A 46th aspect concerns a diagnosis system for diagnosing the wheel alignment of a vehicle (1), said system comprising:
  at least one measuring device (10) configured to measure at least one characteristic parameter of the wheel alignment of the vehicle (1) or of a respective wheel (2), said at least one measuring device (10) further comprising a wireless communication device (12) configured to remotely transmit a signal related to said at least one characteristic parameter;
  at least one remote device (20), physically separated from said measuring device (10), comprising:
    a further wireless communication device (22) configured to remotely receive said signal related to the at least one characteristic parameter measured by the at least one measuring device (10);
    a control unit (21) configured to:
      receive from the further wireless communication device (22) said signal related to the at least one characteristic parameter,
      carry out at least one step of processing said signal to obtain a value of said at least one characteristic parameter;
    at least one screen (23) configured to display at least one characteristic information item, representative of the value of said at least one characteristic parameter;
  an auxiliary remote device (30), separate and distinct from the remote device and from the at least one measuring device (10), wearable by an operator (203) and comprising at least one auxiliary control unit (31) and a respective wireless communication device (32) configured to remotely communicate with the remote device and/or with the at least one measuring device (10), said auxiliary remote device (30) further comprising at least one between a loudspeaker (35), a vibrodine (36) and optionally a screen,
wherein the auxiliary remote device (30) comprises at least one battery (34) connected to provide electrical power supply at least to the auxiliary control unit (31), the wireless communication device, the loudspeaker (35) and/or the vibrodine (36) to allow its operation.

In a 47th aspect according to the preceding aspect said remote device is configured to send a command, as a function of the at least one value of the characteristic parameter of the wheel alignment of the vehicle (1) and/or of a difference thereof with respect to a respective reference value and/or of a ratio thereof with respect to a respective reference value, to the auxiliary remote device (30), said command comprising at least one among:

emitting a sound signal, in particular variable in intensity and frequency as a function of the characteristic parameter or information of the wheel alignment;

emitting a vibrational signal, in particular variable in intensity and frequency as a function of the characteristic parameter or information of the wheel alignment;

optionally emitting a visual signal on the screen (33) comprising at least one numerical, chromatic or figurative indication, representative of the at least one characteristic parameter of the wheel alignment.

In a 48$^{th}$ aspect according to any one of the preceding two aspects the remote device is a fixed computing station, optionally a desktop computer.

A 49$^{th}$ aspect concerns a process of use of a diagnosis system according to any one of the preceding aspects for diagnosing the wheel alignment of a vehicle (1).

A 50$^{th}$ aspects concerns a process of use of a diagnosis system according to any one of the preceding aspects, the process of use comprising:

providing the at least one measuring device (10) at the vehicle (1), optionally fastening at least one component of the at least one measuring device (10) to at least one wheel (2) of the vehicle (1);

deriving, by means of the at least one measuring device (10), the at least one characteristic parameter of the wheel alignment of the vehicle (1);

providing, in particular fastening, the portable remote device (20) at or adjacent to an operating area (201) of a work zone (200) of the operator, said operating area (201) being defined as the area at or closely surrounding the position assumed by the operator (203) during a step of mechanical adjustment of the wheel alignment of the vehicle (1);

displaying on the at least one screen (23) of the portable remote device (20) the characteristic information item thereby providing the operator (203) with a display of the characterizing information visible by the operator directly from said operating area (201) of the work zone (200).

In a 51$^{st}$ aspect according to any one of the preceding two aspects the portable remote device (20) further comprises a support base (25) of said screen (23) and at least one magnetic or magnetizable structure fastened to said support base (25) and configured to allow the removable engagement of the remote device to a metallic structure (202), wherein the use of the diagnosis system (100) comprises the step of removably engaging the portable remote device (20), by means of said magnetic structure (25), to a metallic structure (202) adjacent to or at said operating area (201) of the work zone (200).

In a 52$^{nd}$ aspect according to any one of the preceding three aspects at least during a step of mechanical adjustment of the wheel alignment of the vehicle (1) by the operator (203), a distance interposed between the portable remote device (20) and the operating area (201) of the work zone (200) occupied by the operator (203) is less than 3 meters, in particular less than 2 meters, still more in particular less than 1.5 meters.

In a 53$^{rd}$ aspect according to any one of the preceding four aspects, as the user adjusts the wheel alignment of the vehicle, the control unit (21) of the remote device changes a visually perceivable property, optionally one or more of the color, the tonality, the shape, the size, the contour, of a/said chromatic or figurative indication if the difference between the obtained value of the characteristic parameter of the wheel alignment of the vehicle (1) and the corresponding reference value decreases or if the ratio between the obtained value of the characteristic parameter of the wheel alignment of the vehicle (1) and the corresponding reference value tends to 1.

In a 54$^{th}$ aspect according to any one of the preceding five aspects the control unit (21) of the remote device accentuates a visually perceivable property, optionally increases the intensity of the color, or the tonality or the size, or marks-up the contour, of said chromatic or figurative indication if the change of said difference over time is representative of a reduction of said difference, or the change of said ratio over time is representative of a trend to 1 of said ratio.

In a 55$^{th}$ aspect according to any one of the preceding six aspects the portable remote device (20) comprises at least one loudspeaker (25), and wherein as the user adjusts the wheel alignment of the vehicle the control unit (21) of the portable remote device (20) commands said loudspeaker (25) to increase a frequency or volume of the sound signal if the difference between the obtained value of the characteristic parameter of the wheel alignment of the vehicle (1) and the corresponding reference value decreases or if the ratio between the obtained value of the characteristic parameter of the wheel alignment of the vehicle (1) and the corresponding reference value tends to 1.

In a 56$^{th}$ aspect according to any one of the preceding seven aspects the control unit (21) of the portable remote device increases the frequency or volume of the sound signal if the change of said difference over time is representative of a reduction of said difference, or if the change of said ratio over time is representative of a trend to 1 of said ratio.

In a 57$^{th}$ aspect according to any one of the preceding eight aspects the portable remote device (20) comprises at least one vibrodine (26), and wherein as the user adjusts the wheel alignment of the vehicle the control unit (21) of the portable remote device (20) commands, as a function of said comparison, said vibrodine (26) to increase a frequency or amplitude of the vibrational signal if the difference between the obtained value of the characteristic parameter of the wheel alignment of the vehicle (1) and the corresponding reference value decreases or if the ratio between the obtained value of the characteristic parameter of the wheel alignment of the vehicle (1) and the corresponding reference value tends to 1.

In a 58$^{th}$ aspect according to any one of the preceding nine aspects the control unit (21) of the remote device is configured to increase a frequency or amplitude of the vibrational signal if the change of said difference over time is representative of a reduction of said difference, or the change of said ratio over time is representative of a trend to 1 of said ratio.

A 59$^{th}$ aspect concerns a process of use of a diagnosis system according to any one of claims 1-45 for diagnosing the wheel alignment of a vehicle (1), the process of use comprising:

providing the at least one measuring device (10) at the vehicle (1), optionally fastening at least one component of the at least one measuring device (10) to at least one wheel (2) of the vehicle (1);

deriving, by means of the at least one measuring device (10), the at least one characteristic parameter of the wheel alignment of the vehicle (1);

transporting, by the operator (203), the portable remote device (20) into an operating area (201) during a step, or between two or more steps, of mechanical adjustment of the wheel alignment of the vehicle (1), the operating area (201) being defined as the area at or closely surrounding the position assumed by the operator (203) during a step of mechanical adjustment of the wheel alignment of the vehicle (1);

displaying on the at least one screen (23) said characteristic information item.

In a 60$^{th}$ aspect according to the preceding aspect the diagnosis system further comprises an auxiliary remote device (30), wearable by an operator (203) and wirelessly associable to the remote device and/or to the at least one measuring device (10), said auxiliary remote device (30) comprising at least one respective wireless communication device configured to remotely communicate with the remote device and/or with the at least one measuring device (10), said auxiliary remote device (30) further comprising at least one among a loudspeaker (35), a vibrodine (36) and a screen (33);

said portable remote device (20) sending a command, as a function of the at least one value of the characteristic parameter of the wheel alignment of the vehicle (1) and/or of a difference thereof with respect to a respective reference value and/or of a ratio thereof with respect to a respective reference value, to the auxiliary remote device (30), said command comprising at least one among:

a command to emit a sound signal, in particular variable in intensity and frequency as a function of the characteristic parameter or information of the wheel alignment;

a command to emit a vibrational signal, in particular variable in intensity and frequency as a function of the characteristic parameter or information of the wheel alignment;

a command to emit a visual signal on the screen comprising at least one numerical, chromatic or figurative indication, representative of the at least one characteristic parameter of the wheel alignment, wherein the process of use of said diagnosis system by an operator (203) at the operating area comprises:

providing the at least one measuring device (10) at the vehicle (1), optionally associating at least one portion of the measuring device (10) to at least one wheel (2) of the vehicle (1);

deriving, by means of the at least one measuring device (10), the at least one characteristic parameter of the wheel alignment of the vehicle (1);

wearing, by the operator (203), the auxiliary remote device (30), the operator (203), while adjusting the wheel alignment of the vehicle, perceiving at least one among a sound, a vibrational and a visual signal emitted by the auxiliary remote device (30) as a function of the at least one value of the characteristic parameter of the wheel alignment of the vehicle (1) or of a difference thereof with respect to a corresponding reference value.

The invention can provide a diagnosis system that enables the operator to act mechanically on the vehicle and, simultaneously, to measure in real time the changes to characteristic parameters of the wheel alignment of the car. The invention can also provide a diagnosis system that can be used by an operator in a flexible manner in any area of the work zone, for example at a plurality of areas of a mechanical workshop.

Yet a further objective is to provide a diagnosis system that allows the operator to obtain a rapid and immediate indication of the characteristic parameters of the wheel alignment with no need to move away from the point where the mechanical adjustment operations are carried out on the vehicle. This can also allow a reduction of the working times for setting the characteristic parameters of the wheel alignment of a vehicle.

Other features and advantages will be readily apparent from the following description and drawings.

BRIEF DESCRIPTION OF THE DRAWINGS

Some embodiments and some aspects of the invention shall be described herein below with reference to the accompanying drawings, provided for indicative purposes only and therefore not limiting, wherein:

FIG. 2 is a lateral schematic view of a support of a measuring device associated with a wheel of a vehicle;

FIG. 3 is a perspective view of a measuring device of the diagnosis system according to another embodiment herein disclosed;

FIG. 4 is a lateral view of a measuring device associated with a wheel of a vehicle and part of an embodiment of a diagnosis system herein disclosed;

Figure 1:
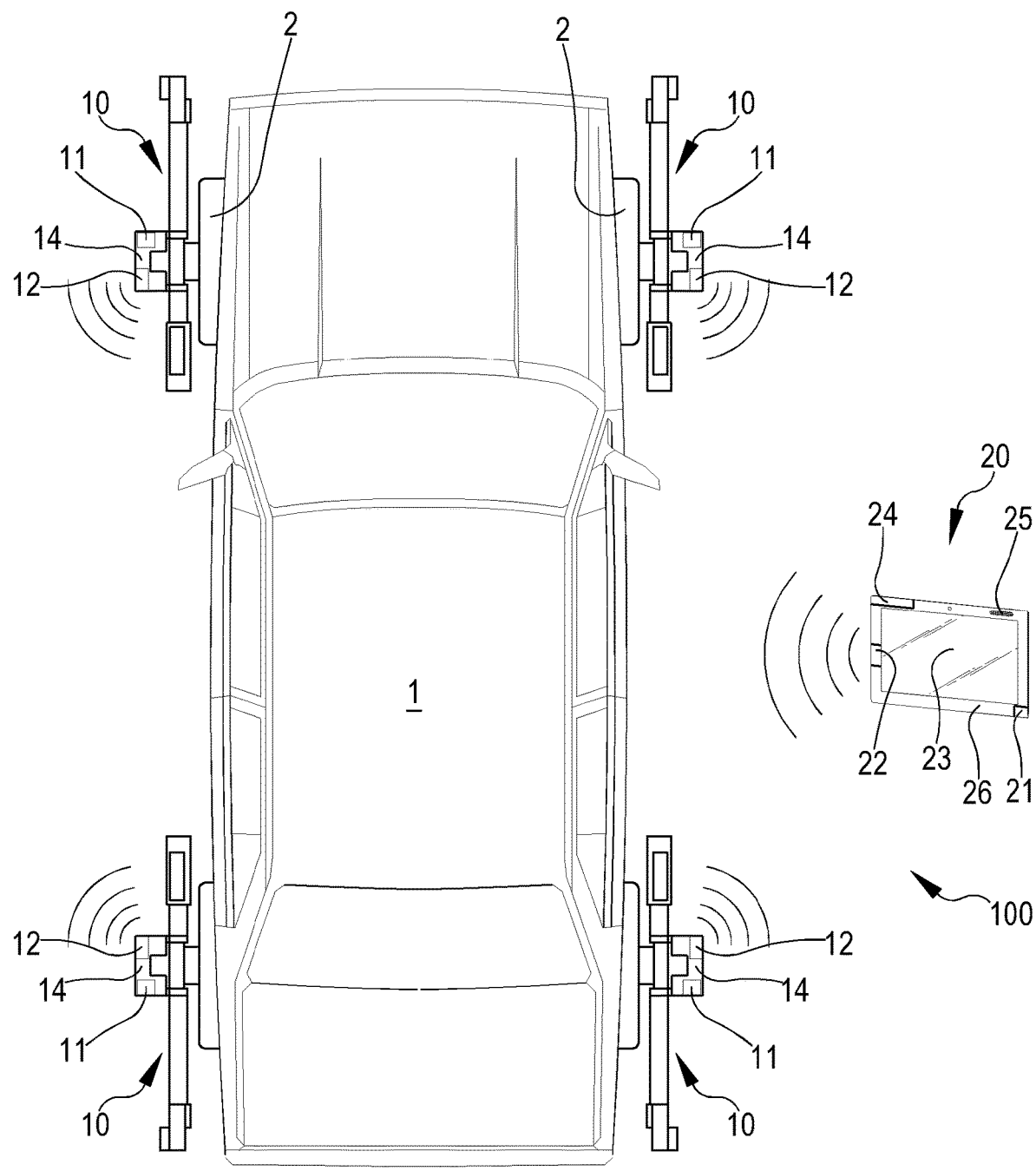
FIG. 1 is a schematic top view of an embodiment of a diagnosis system associated with a vehicle.

It should be noted that in the present detailed description corresponding parts illustrated in the various figures are indicated with the same numerical references. The figures could illustrate the object of the invention through representations not in scale; therefore, parts and components illustrated in the figures related to the object of the invention could pertain exclusively to schematic representations.

DEFINITIONS AND CONVENTIONS

Control Unit or Controller

The diagnosis system described and claimed herein comprises at least one control unit (i.e., controller) for processing the data received from the measuring devices.

The control unit can be a single unit or be formed by a plurality of distinct control units according to design decisions and operating requirements.

The term "control unit" means an electronic component that can comprise at least one of: a digital processor (CPU), an analog circuit, or a combination of one or more digital processors with one or more analog circuits. The control unit can be "configured" or "programmed" to carry out some steps: this can be achieved in practice with any means that allows to configure or to program the control unit. For example, in case of a control unit comprising one or more CPUs and one or more memories, one or more programs can be stored in appropriate memory banks connected to the CPU or to the CPUs; the program or programs contain instructions that, when executed by the CPU or by the CPUs, program or configure the control unit to perform the operations described in relation to the control unit. Alternatively, if the control unit is or comprises analogic circuitry, then the circuit of the control unit can be designed to include circuitry configured, in use, to process electrical signal so as to carry out the steps relating to the control unit.

Toe Angle

The toe of a wheel of a vehicle is defined, according to a top view of the vehicle, as the angle interposed between the longitudinal axis of the vehicle and a plane passing through the wheel and orthogonal to the axis of rotation of the wheel.

In accordance with a common convention, the toe angle is defined as positive if the longitudinal axis of the vehicle and the rolling plane of the wheel intersect anteriorly, according to an ordinary direction of advancement of the vehicle, with respect to the axle of said wheel. Vice versa, the toe angle is defined as negative if the longitudinal axle of the vehicle and the rolling plane of the wheel intersect posteriorly, according to an ordinary direction of advancement of the vehicle, with respect to the axle of said wheel.

The toe angle value can be referred to as the angle of inclination of an individual wheel (partial toe PT), or it can be referred to as the sum of the angles of inclination of two wheels of the same axle (total toe TT).

The toe angle can be modified by mechanical adjustment of the geometry of the suspension of the involved wheel. In particular, it is possible to adjust the toe angle at the forward axle and, in some cases, at the rear axle of the vehicle.

Camber Angle

The camber of a wheel of a vehicle is defined, according to a front view of the vehicle, as the angle interposed between an axis orthogonal to the ground and a plane passing through the wheel and orthogonal to the axis of rotation of the wheel (rolling plane).

In accordance with a common convention, the camber angle is defined as positive if the axis orthogonal to the ground and the rolling plane of the wheel intersect below the vehicle. Vice versa, the camber angle is defined as negative if the axis orthogonal to the ground and the rolling plane of the wheel intersect above the vehicle.

The camber angle can be modified by mechanical adjustment of the geometry of the suspension of the involved wheel. In particular, it is possible to adjust the camber angle at the forward axle and, in some cases, at the rear axle of the vehicle.

Caster Angle

The caster of a wheel of a vehicle is defined, according to a lateral view of the vehicle, as the angle interposed between an axis orthogonal to the ground and the steering axis of the wheel.

In accordance with a common convention, the caster angle is defined as positive if the steering axis intersect the ground anteriorly, according to an ordinary direction of advancement of the vehicle, with respect to the wheel-ground contact point. Vice versa, the caster angle is defined as negative if the steering axis intersects the ground posteriorly, according to an ordinary direction of advancement of the vehicle, with respect to the wheel-ground contact point.

The caster angle can be modified by mechanical adjustment of the geometry of the suspension of the involved wheel. The adjustment of the caster angle is possible at the steering axis of the vehicle (hence, prevalently, only at the forward axle).

Tilt of the Kingpin

The tilt of the kingpin of a vehicle is defined, according to a front view of the vehicle, as the angle interposed between an axis orthogonal to the ground and the steering axis of the wheel.

Included Angle

The included angle of a wheel of a vehicle is defined, according to a front view of the vehicle, as the angle interposed between the steering axis and a plane passing through the wheel and orthogonal to the axis of rotation of the wheel.

Thrust Angle

The thrust angle of a vehicle is defined as the difference between the individual toe angles of the rear wheels. If the rear wheels have equal toe angles, the thrust angle is zero, defining a thrust axis parallel to the longitudinal axis of the vehicle.

Inter-Axle Spacing Difference

The inter-axle spacing of a vehicle is defined as the longitudinal distance between a front wheel and a rear wheel of a same side of the vehicle.

The value of the left inter-axle spacing of a vehicle is commonly equal to the right one: inter-axle spacing differences can cause problems relating to the wheel alignment of the vehicle.

Setback Inclination

The setback inclination is defined as the angle interposed between a transverse axis of the vehicle (orthogonal to the longitudinal axis of the vehicle) and the axis joining the wheels of a same axle.

DETAILED DESCRIPTION

Diagnosis System

Figures 9, 10A:
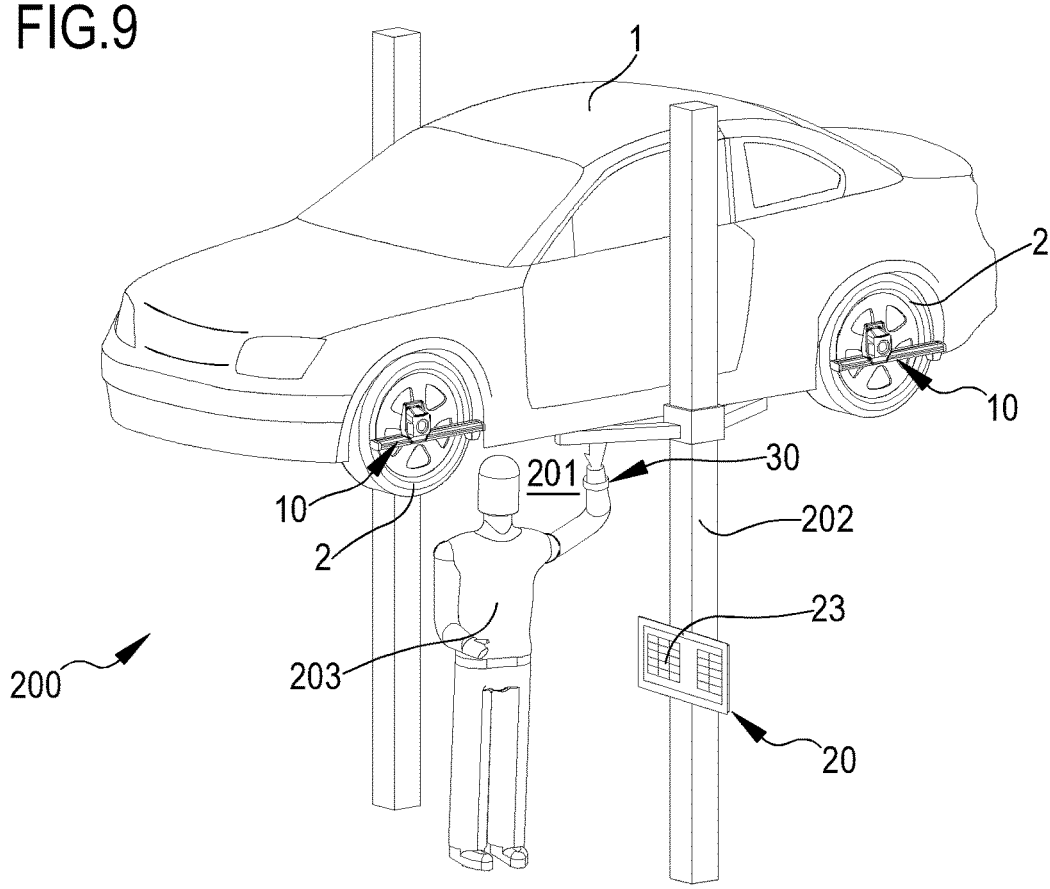
FIG. 9 is a representative view of an operating condition of a diagnosis system according to an embodiment herein disclosed.
FIGS. 10A, 10B and 11 show the characteristic information of the wheel alignment of a vehicle displayed on a screen of a diagnosis system according to an embodiment herein disclosed.

The numeral 100 indicates in its entirety a system for diagnosing the wheel alignment of a vehicle 1, as shown schematically during an operating step in FIGS. 1 and 9. The diagnosis system 100 is directed at measuring one or more characteristic parameters of the alignment of the vehicle, for example the toe angle, camber angle, caster angle, and tilt of the kingpin of one or more wheels of the vehicle. In addition, said characteristic parameters may comprise the included angle, the thrust angle, the difference between the left and right inter-axle spacing of the vehicle and the setback inclination. These characteristic parameters of the alignment of the vehicle have been described and defined in detail in the previous section.

Said diagnosis system 100 is then configured to measure distances or angles relating to each of the wheels of the vehicle, necessary for subsequent processing, by a control unit, in order to obtain representative numerical values of each characteristic parameter.

In this regard the diagnosis system 100 comprises at least one measuring device (10), shown in FIGS. 1, 3, 5, 7 and 9, configured to measure at least one signal relating to a characteristic parameter of the wheel alignment of the vehicle 1 or of a respective wheel 2. More in detail, each measuring device 10 comprises a wireless communication device 12 configured to remotely transmit said signal related to the characteristic parameter of the wheel alignment: the distance may reach 50 meters, in particular up to 25 meters, yet more in particular up to 20 meters. The wireless communication device 12 can use a Bluetooth technology, Wi-Fi for example according to IEEE 802.11, radio waves, GPRS. These wireless signal transmission technologies are listed solely for exemplifying purposes: further wireless technologies or future developments of said wireless technologies may be used for the transmission of the signal related to the characteristic parameter of the wheel alignment.

The measuring device 10 may also comprise at least one battery 14 electrically connected to the wireless communication device 12 to allow its operation: in an option, the measuring device 10 may have power only supplied by the battery 14, preferably of rechargeable type, with no need for additional power supply by cable connected to the general electrical power grid.

The measuring device 10 may comprise, in accordance with an embodiment shown in FIGS. 1 and 3, an emitter 13 configured to emit a light signal, for example an infrared signal, and optical sensor, for example a CCD or CMOS optical sensor, configured to detect said light signal. The optical sensor comprises a plurality of optical detectors to define a predefined matrix of detectors adapted to detect the light signal emitted by the emitter 13: as a function of the position of the optical detector impacted by the light signal, the measuring device 10 is configured to emit the signal related to a characteristic parameter of the vehicle.

Figure 5:
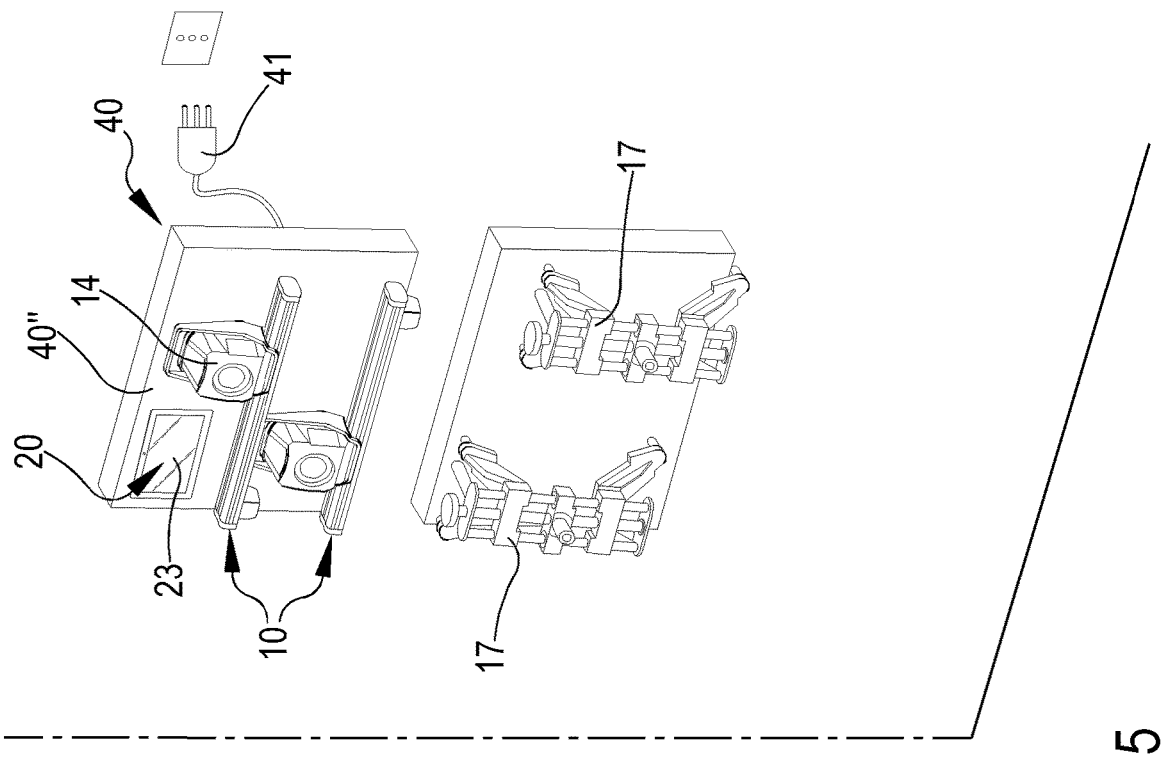
FIG. 5 is a perspective view of a wall-mounted support part of the diagnosis system according to another embodiment herein disclosed.
Figure 5:
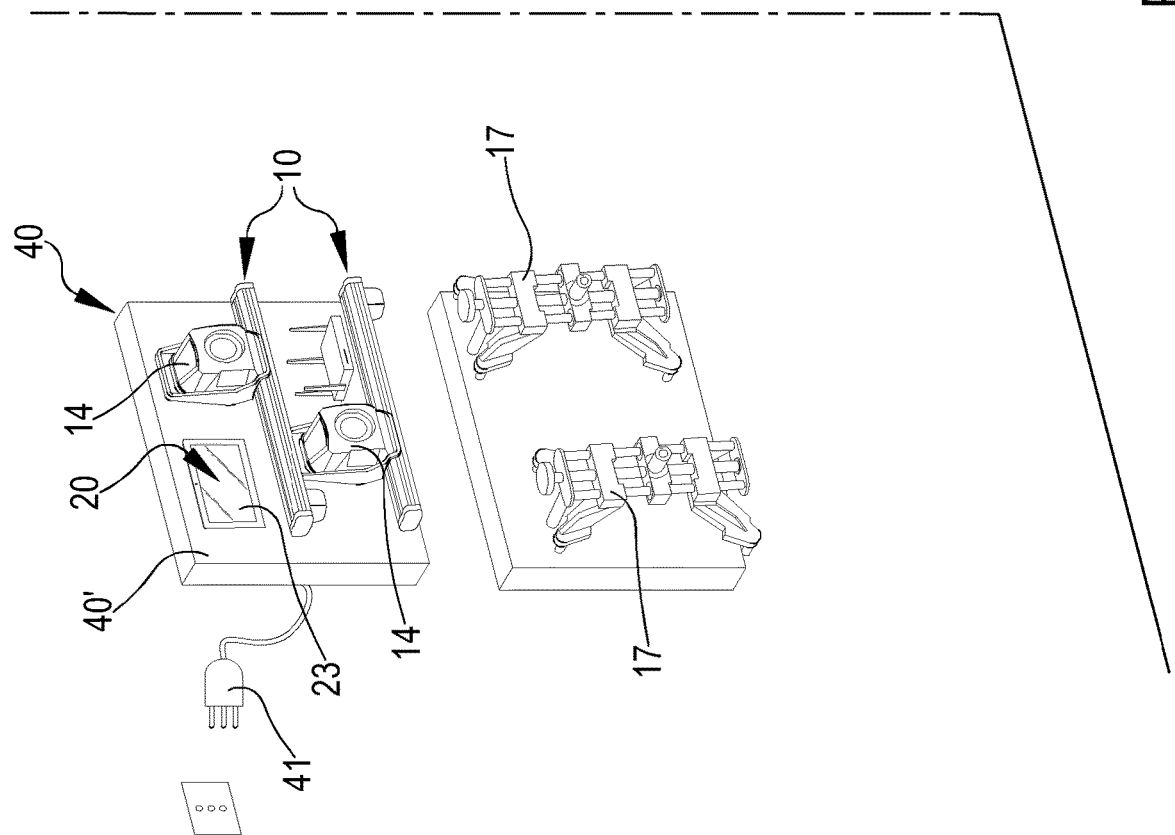

The diagnosis system further comprises a wheel support 17, shown in FIG. 2, which in accordance with an alternative embodiment shown in FIG. 5 is configured to allow the coupling of a measuring device 10 to a wheel 2 of the vehicle 1. The wheel support 17 is operatively interposed between the measuring device 10 and the wheel 2 and comprises an engagement system configured to securely engage to the wheel, and in particular to the rim, of the vehicle. The engagement system may comprise extensible arms to allow coupling to rims of different dimensions. In addition, the measuring device 10 may comprise a magnetic support configured to allow the fastening between the measuring device and the wheel support.

In the embodiment shown in FIGS. 2, 3 and 4, the measuring device, when fastened to the wheel of the vehicle by means of the wheel support 17, may be movable by rotation around the axis of rotation of the wheel, at least during a step of setting up the diagnosis system: after set-up rotation is blocked by means of a locking system.

The measuring device 10 may further comprise an inclination sensor configured to measure an inclination of the device when mounted on the wheel 2: the inclination sensor may be a mono-axial, bi-axial or tri-axial sensor. In particular, the inclination of the measuring device is processed, together with the signals detected by the optical sensor, to provide the signal related to the characteristic parameter of the wheel alignment.

Figure 1A:
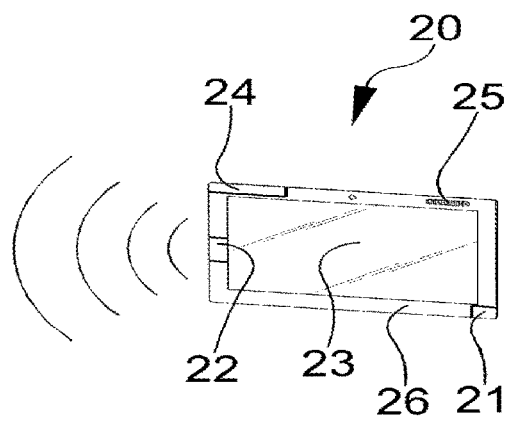
FIG. 1A is a schematic perspective view of an additional embodiment of a diagnosis system associated with a vehicle.
Figure 1A:
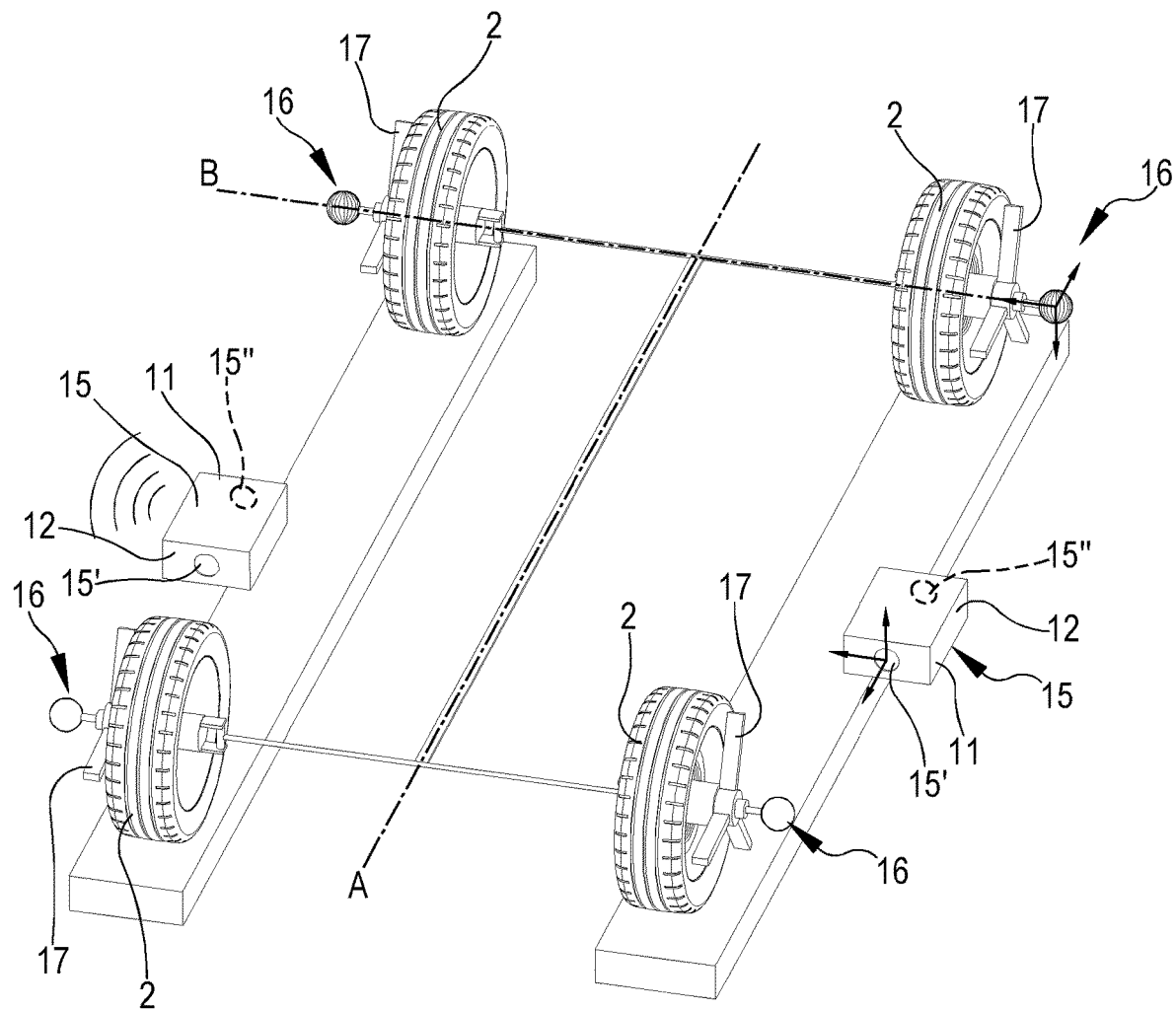

In accordance with an additional embodiment shown in FIG. 1A, the measuring device 10 may comprise a camera 15, carried by a fixed structure, and at least one optical target 16, mounted on a wheel 2 of the vehicle 1: the signal related to a characteristic parameter of the wheel alignment of the vehicle is derived starting from an image of the optical target taken by the camera. Each optical target 16 is configured to be securely fastened to a respective wheel of the vehicle and comprises, on a lateral surface thereof, a predefined pattern comprising a plurality of reference regions: the optical target preferably presents semi-circular shape and the predefined pattern comprises a plurality of lines or geometric shapes. The image taken by the camera 15 thus comprises 3D information and allows, through a step of post-processing the image, to measure the characteristic parameters of the alignment of the vehicle.

In particular, in the measuring device 10 in accordance with this latter embodiment a camera 15 may be fastened to a fixed structure, for example fastened to the ground or to a vehicle lift, for each side of the vehicle (see FIG. 1A): in other words a camera 15 may be positioned on the left side of the vehicle and an additional camera may be positioned on the right side of the vehicle. Each camera 15 further comprises a first optical detector 15' directed at framing an optical target 16 fastened to a front wheel of the vehicle, and a second optical detector directed at framing an optical target fastened to a rear wheel of the vehicle, as shown schematically in FIG. 1A.

The optical target 16 may be fastened to a wheel of the vehicle by means of the previously described wheel support 17, as shown in FIG. 1A.

In accordance with the embodiments that have just been described, each measuring device 10 comprises a local control unit 11 operatively connected to the wireless communication device 12, to the battery 14, to the optical sensor and light emitter 13, and configured to carry out the steps of measuring the characteristic parameter and to allow remote transmission of the signal related to the characteristic parameter. In accordance with the embodiment of the measuring device comprising the camera 15, the control unit is similarly operatively connected with the camera to carry out the steps of detecting the image: the wireless communication device 12 may be configured to transmit the image to a remote device to allow its processing to derive the signal related to the characteristic parameter of the wheel alignment, or, alternatively, the local control unit 11 of the measuring device may be configured to process said image and derive the signal related to the characteristic parameter of the wheel alignment.

The diagnosis system 100 comprises a measuring device 10 for each wheel of the vehicle, as shown in the embodiment of FIG. 1: alternatively, in the embodiment of FIG. 1A, the measuring system 10 comprises two cameras, each positioned at a side of the vehicle, and an optical target for each of the wheels of the vehicle.

The diagnosis system 100 further comprises at least one portable remote device 20, shown schematically in FIGS. 1, 5, 7 and 9, physically separate and distinct from the measuring device 10. The portable remote device 20 comprises at least one wireless communication device 22 configured to remotely receive a signal related to the characteristic parameter obtained from the measuring device 10: the technical characteristics of the wireless communication device 22 may be the same or similar to those of the wireless communication device 12 of the previously described measuring device 10. The portable remote device 10 further comprises a control unit 21 configured to receive from the wireless communication device 22 the signal related to the characteristic parameter of the wheel alignment of the vehicle 1 and, sequentially, to carry out a step of processing this signal to derive a value of the characteristic parameter of the wheel alignment of the vehicle. In particular, the wireless communication device 22 of the remote device 20 may be configured to receive a plurality of signals each representative of one or more characteristic parameters of each wheel, for example toe, camber and caster of each wheel of the vehicle.

In addition, the control unit 21 of the remote device 20 is configured to receive at least one reference value related to a respective characteristic parameter of the wheel alignment of the vehicle. In particular, each characteristic parameter, i.e. toe, camber and caster, is associated to a range of reference values, wherein said reference values are preferably associated with the specific vehicle under examination. In other words, the diagnosis system receives reference values for each characteristic parameter of the wheel alignment for a specific vehicle: this is due to the fact that, depending on the type, brand and model of the vehicle under test, the optimal values of the characteristic parameters of the wheel alignment may change, to obtain the best dynamic behavior of the vehicle.

These reference values may be included in a database, the latter transmitted to the portable remote device 20 through the wireless communication device 22: the database may for example be reached through the Internet and stored on a remote server that is separate and distinct from the device 20. Alternatively, the database may be stored on a physical memory, for example a hard disk, a USB flash drive, an optical storage support (CD, DVD) or any type of digital memory connectable to, or included in, the remote device 20. The database preferably comprises a plurality of brands, models and types of vehicles, each associated with a plurality of reference values related to each characteristic parameter of the wheel alignment of the vehicle. The identification of the type of the vehicle, of the brand and of the model may be carried out by analyzing the license plate of the vehicle under test: this therefore makes it possible to access the database and to obtain the reference values of the vehicle. In particular, the portable remote device 20 is configured to allow an operator to type the license plate number or the vehicle identification number or the brand and model of the vehicle, and, according to this information, to access the database comprising the specific reference values of the vehicle under examination. In an auxiliary embodiment, the portable remote device may comprise a camera, connected to the control unit 21, configured to record an image bearing the license plate of the vehicle: the control unit 21 is then configured to process said image of the license plate to derive the number of the license plate and then access the database of the reference values.

The portable remote device 20 further comprises at least one screen (23) configured to display at least one characteristic information item, representative of the value of a characteristic parameter of the wheel alignment of the vehicle. The characteristic information shown on the screen may comprise a numerical representation, a chromatic indication, a cursor 501, a schematic image of the vehicle 1, or a schematic image of at least one respective wheel 2 representative of the value of one or more characteristic parameters of the wheel alignment of the vehicle. FIG. 10A shows a screen displayed on a remote device of the diagnosis system 100 in which are shown a plurality of numeric values related to respective characteristic parameters of the alignment of the vehicle, including total toe TT, partial toe PT, camber CAM, caster CAS, King-Pin angle KP, the included angle IA and the thrust angle TA, in which said values are separate for the front axle FA and for the rear axle RA of the vehicle. The values of partial toe PT, camber CAM, caster CAS, King-Pin KP and included angle IA are indicated respectively for the left wheel and the right wheel of the vehicle of each axis.

The screen of FIG. 10A also shows the respective reference values REF for each characteristic parameter: these reference values represent the optimal value of the respective characteristic parameter for a specific vehicle. For example, the reference value −1.12 represents the optimal value of total toe for the vehicle under examination. In particular each characteristic parameter is associated to a range of optimal reference values, within which the corresponding value of a measured characteristic parameter should preferably fall. Additionally, as described previously, the characteristic information shown on the screen may comprise a chromatic indication representative of said values or of their difference with respect to the range of reference values: for example, a value of the measured characteristic parameter may be displayed in different colors as a function of whether said value of the parameter is inside or outside the reference range. For example, a value of a measured characteristic parameter within said reference range may be preferably highlighted in green: vice versa, a measured value of a characteristic parameter outside said reference range may preferably be highlighted in red. The chromatic information associated with the value of the characteristic parameter enables the operator to rapidly assess whether or not the values of the characteristic parameters of the alignment of the vehicle in examination are correct. Of course alternative visually perceivable features such as shape or size of the visualized information may be used to indicate whether the characteristic parameter value falls or not in the desired reference range.

Figure 10B:
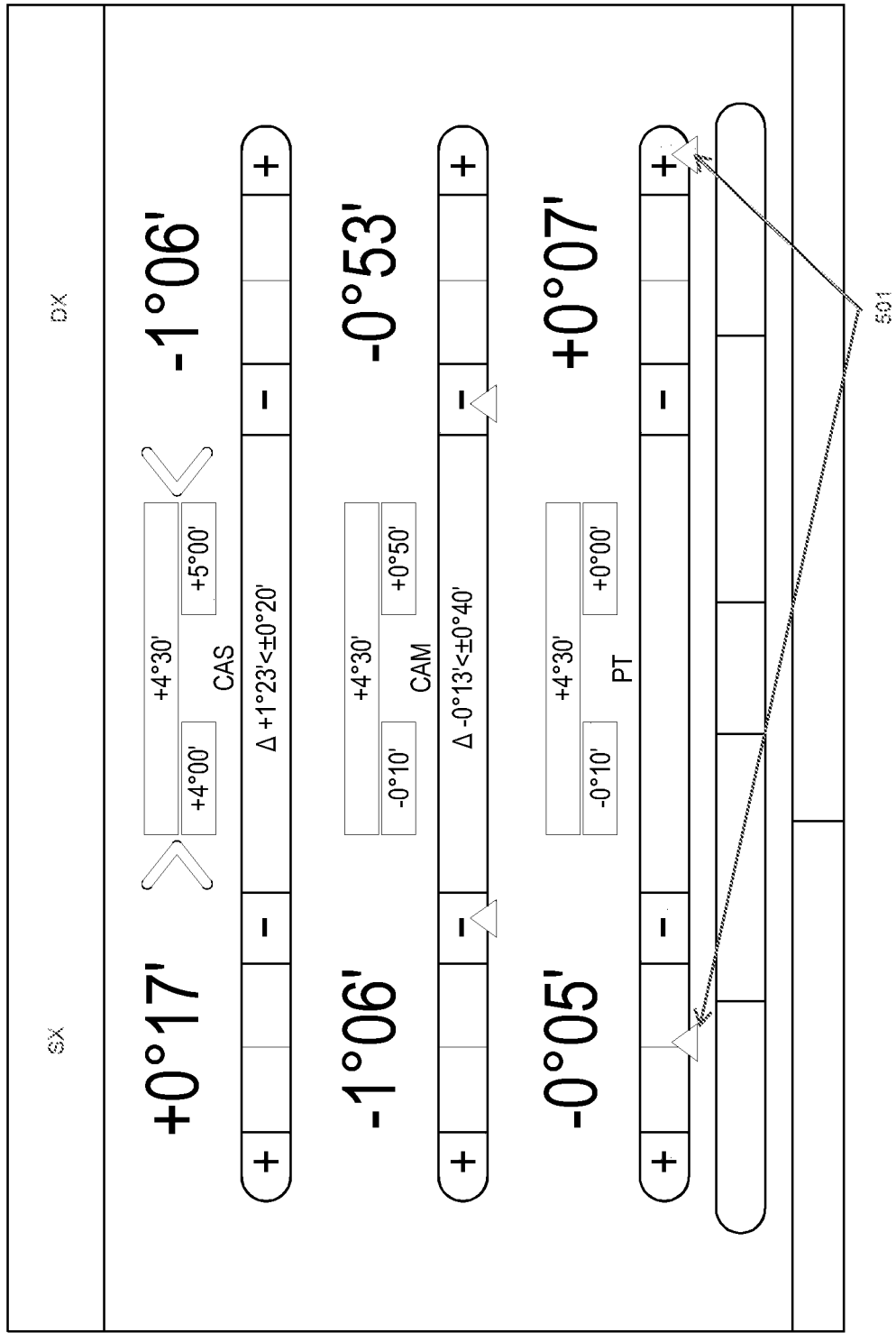

FIG. 10B shows an additional type of display for each value of the characteristic parameters: in particular, the characteristic information comprises, in addition to a numeric indication of the value of the characteristic parameter, a cursor 501 located in a position representative of the value of a respective characteristic parameter. In particular said cursor 501 allows a rapid display of the positive or negative sign of the value of the characteristic parameter for each left wheel SX and right wheel DX of the vehicle.

Figure 11:
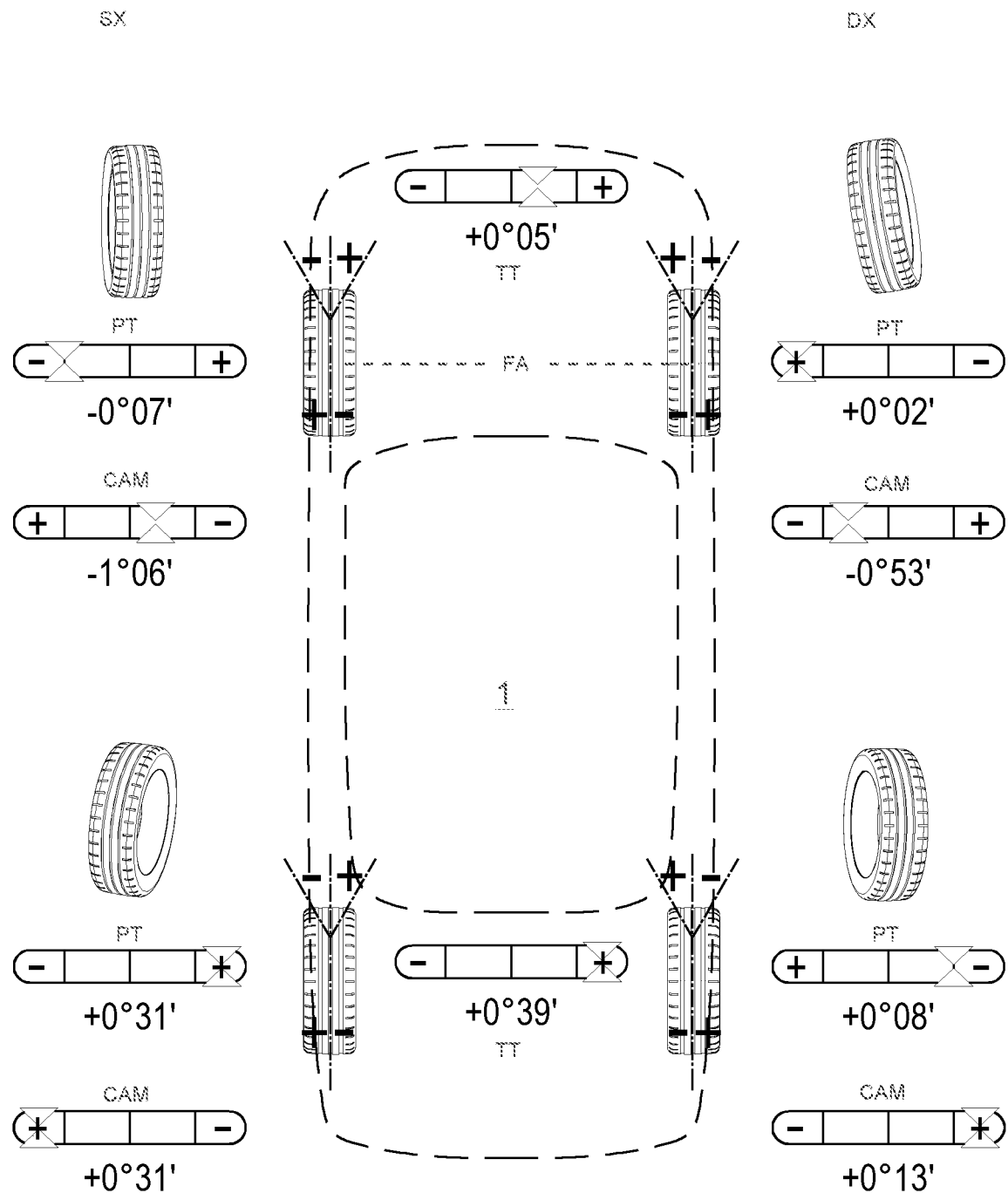

In accordance with an additional type of display shown in FIG. 11, the characteristic information related to the values of the characteristic parameter comprises a schematic image of the vehicle 1 and a schematic image of the wheels 2 in a position representative of the value of the associated characteristic parameter. In particular the wheels 2 represented on the screen 23 present an inclination representative of the value of the characteristic parameter: for example, an accentuated camber CAM of the left front wheel equal to −1.06° is graphically highlighted showing the wheel inclined. Similarly the left rear wheel, presenting an accentuated partial toe PT of +0.31°, is highlighted by graphically showing the wheel inclined.

The screen 23 of the portable remote device 20 may preferably have dimensions between 4" and 15", in particular between 5" and 12": optionally, the screen 23 may be a touch screen. These dimensions are selected in relation to the fact that said portable remote device 20 must be easily transportable: in other words, the remote device 20 has limited dimensions and weight, compatible with a portable utilization thereof, such that an operator must be able to transport it easily by hand into the work area, for example into the workshop, during the operations for maintenance and adjustment of the wheel alignment of the vehicle. The portable remote device 20 is then directed at a use and a manual transport by an operator, for example in which the operator supports the portable remote device 20 with only one hand or with both hands. In this regard the weight of the portable remote device is preferably limited to no more than 1500 g, preferably between 60 g and 1500 g, in particular between 90 g and 700 g, still more in particular between 100 g and 400 g. Additionally, if the portable remote device is a smartphone or a tablet, the weight may be further reduced and included between 60 g and 250 g.

The portable remote device 20 further comprises at least one battery 24, of the rechargeable type, electrically connected at least to the control unit 21, to the wireless communication device 22 and to the screen 23 and configured to allow its operation. In particular the portable remote device 20 may only be powered by and configured to operate solely by means of the battery 24, with no need for an additional energy source, in particular with no need for a wired connection via cable to the general electric power grid.

Figure 6:
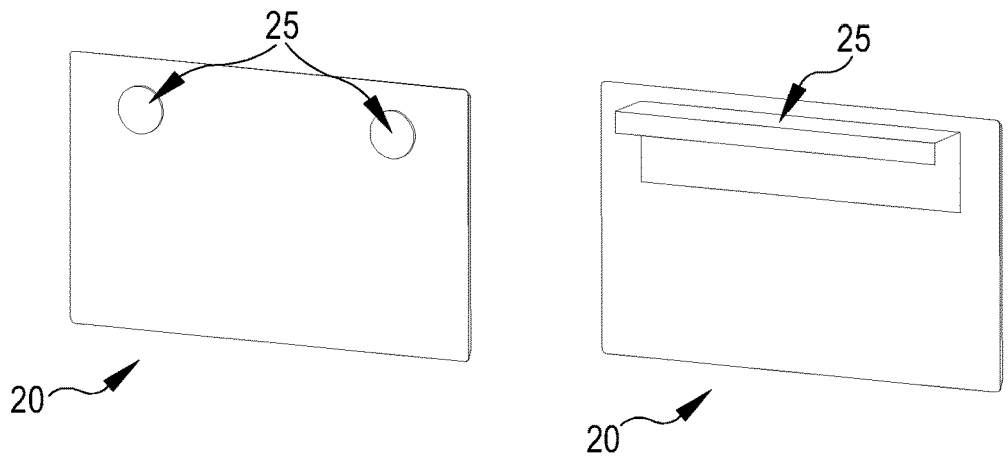
FIG. 6 is a rear perspective view of a portable measuring device of the diagnosis system according to a further embodiment herein disclosed.

The portable remote device 20 may also comprise, as shown in FIG. 6, a support base 25 of said screen 23 and at least one magnetic or magnetizable structure fastened to the support base 25 and configured to allow the removable engagement of the remote device to a metallic structure 202.

The portable remote device 20 may also comprise a loudspeaker 25 connected to the control unit 21 and configured to emit a sound signal as a function of a value of a characteristic parameter of the wheel alignment or of a difference thereof with respect to the corresponding reference value. The sound signal may be variable, in terms of intensity and/or frequency, as a function of the difference between the measured value of a characteristic parameter and the corresponding reference value: for example, if said difference is greater than a predefined threshold, the control unit 21 may be configured to command the loudspeaker 25 to emit a sound signal to notify the operator of said difference. The intensity of the sound signal may also be variable as a function of said difference: for example, the intensity of the sound signal emitted by the loudspeaker 25 may increase as the difference between the measured value of a characteristic parameter and the corresponding reference value decreases. Additionally, or alternatively, the frequency of the sound signal emitted by the loudspeaker 25 may change as a function of said difference: for example, the frequency of the sound signal emitted by the loudspeaker 25 may increase as the difference between the measured value of a characteristic parameter and the corresponding reference value decreases. In addition, the frequency and the intensity of the sound signal may change as a function of a change, in a predefined and preferably short time interval, of the difference between the measured value of a characteristic parameter and the corresponding reference value. In other words, said change of the difference between measured value and reference value is representative of a derivative of said difference over time: this allows an immediate assessment of whether the mechanical adjustment operations being carried out by the operator 203 are directed in the proper direction of reduction of the difference between measured value and reference value. The sound signal emitted by the loudspeaker may then change during the mechanical adjustment operations, facilitating the correct repositioning of the wheels of the vehicle carried out by the operator.

The portable remote device 20 may also comprise a vibrodine 26 (i.e. a vibrational transducer) connected to the control unit 21 and configured to emit a vibrational signal as a function of a value of a characteristic parameter of the wheel alignment or of a difference thereof with respect to the corresponding reference value. The vibrational signal may be variable, in terms of intensity and/or frequency, as a function of the difference between the measured value of a characteristic parameter and the corresponding reference value: for example, if said difference is greater than a predefined threshold, the control unit 21 may be configured to command the vibrodine 26 to emit a vibrational signal to notify the operator of said difference. The intensity of the vibrational signal may also be variable as a function of said difference: for example, the intensity of the vibrational signal emitted by the vibrodine 26 may increase as the difference between the measured value of a characteristic parameter and the corresponding reference value decreases. Additionally, the frequency of the vibrational signal emitted by the vibrodine 26 may change as a function of said difference: for example, the frequency of the vibrational signal may increase as the difference between the measured value of a characteristic parameter and the corresponding reference value decreases. In addition, the frequency and the intensity of the vibrational signal may change as a function of a change, in a predefined and preferably short time interval, of the difference between the measured value of a characteristic parameter and the corresponding reference value. In other words, said change of the difference between measured value and reference value is representative of a derivative of said difference over time: this allows an immediate assessment of whether the current mechanical adjustment operations being carried out by the operator 203 are directed in the proper direction of reduction of the difference between measured value and reference value. The vibrational signal may then change during the mechanical adjustment operations, facilitating correct repositioning of the wheels of the vehicle carried out by an operator.

During mechanical adjustment by the operator, shown schematically in FIG. 9, each change of the values of the characteristic parameters of the alignment of the vehicle is then measured by the measuring devices 10 and transmitted to the portable remote device 20: the latter is then configured to display on the screen 23 the values of the characteristic parameters and/or to command the activation of the loudspeaker and/or of the vibrodine so as to communicate to the operator whether or not the values of the characteristic parameter are correct, with no need for the operator to move from his/her operating position.

In an embodiment, the portable remote device 20 may be a tablet, a portable computer or a smartphone.

In an alternative embodiment, the portable remote device 20 is a head wearable device, comprising a frame for eyeglasses bearing the control unit 21, the wireless communication device 22 and the battery 24. According to this embodiment, the control unit 21, the wireless communication device 22 and the battery 24 are inserted inside the eyeglass frame itself. The wearable device further comprises one or more lenses, for example transparent lenses, optionally polarized or if necessary prescription lenses, mounted on the eyeglass frame to define at least partially the screen 23 of the portable remote device 20.

In other words, the wearable portable remote device 20 enables the operator to display the characteristic information, representative of the characteristic parameters of the wheel alignment, on the lenses of the eyeglasses: in this way the operator 203 can easily operate on the vehicle and at the same time display the relevant information about the wheel alignment of the vehicle, with no need for the operator to move, turn around or hold any device in his/her hand. Moreover, the portable remote device 20, in said embodiment comprising the eyeglass frame, may comprise the loudspeaker and the vibrodine having the features previously described.

Figure 8:
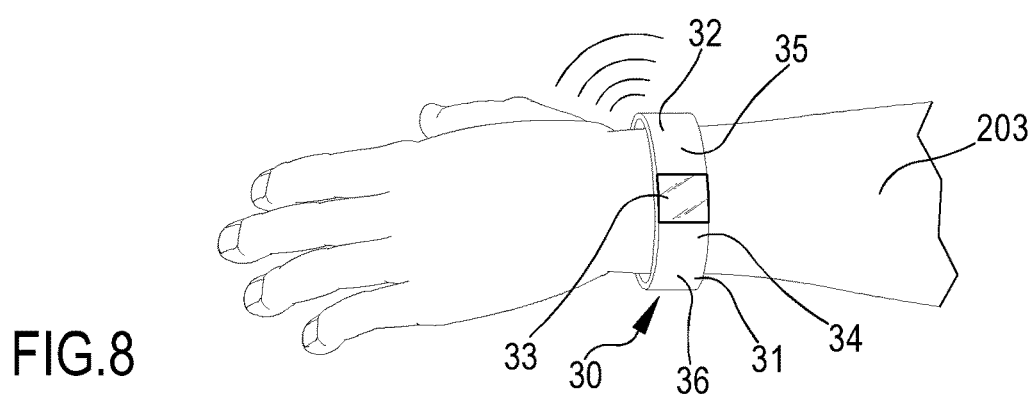
FIG. 8 is a perspective view of a wearable remote device of the diagnosis system according to an embodiment of the system herein disclosed.

The diagnosis system 100 may comprise an auxiliary remote device 30, shown schematically in FIGS. 8 and 9, wearable by an operator 203: for example, the auxiliary remote device 30 may be worn on the wrist by the operator 203. More in detail, the auxiliary remote device 30 may be a smartwatch or an electronic bracelet.

The auxiliary remote device 30, separate and distinct from the portable remote device 20 and from the measuring device 10, comprises at least one wireless communication device 32 configured to remotely communicate with the portable remote device 20 and optionally with the measuring device 10 to receive at least one indication representative of a value of a characteristic parameter of the wheel alignment of the vehicle 1.

In particular, the auxiliary remote device 30 is configured to remotely receive the value of the characteristic parameter or the signal related to the characteristic parameter.

The auxiliary remote device 30 may further comprise an auxiliary control unit 31 operatively connected to the wireless communication device 32, a loudspeaker 35 and/or a vibrodine 36 and at least one battery 34 configured to provide electrical power supply to the auxiliary remote device so that the latter is independent of additional energy sources. The operation of the loudspeaker 35 and of the vibrodine 36 (when one or both these components are present in the auxiliary remote device) is similar to the one previously described in relation to the loudspeaker 25 and vibrodine 26 of the remote device 20: in particular the loudspeaker 35 and the vibrodine 36 of the auxiliary remote device 30 are connected to and may be activated by the auxiliary control unit 31 of the auxiliary remote device 30 itself, as a function of the value of the characteristic parameters of the wheel alignment of the vehicle 1. Similarly to what was previously described, intensity and/or frequency of the sound and/or vibrational signal emitted by the loudspeaker 35 and/or by the vibrodine 36 of the auxiliary remote device 30 may be changed as a function of the value of the value of the characteristic parameters of the wheel alignment of the vehicle 1 and of the distance with respect to a reference value.

The auxiliary remote device 30 may further comprise a screen 33 connected to the control unit 31 and configured to display the values of the characteristic parameters of the wheel alignment of the vehicle 1. The dimension of the screen 33 can be between 0.5" and 2.5", in particular between 1" and 2". It should be noted that the description pertaining to the characteristic information displayed on the screen 23 of the portable remote device 20 also applies to the characteristic information displayed on the screen 33 of the auxiliary remote device 30. For example, a chromatic indication (or other visually perceivable indication) representative of the values of a characteristic parameter or of a difference thereof with respect to a reference value can be displayed on the screen 33 of the auxiliary remote device 30.

In accordance with an embodiment, the auxiliary remote device 30 is configured to communicate with the portable remote device 20: the latter is configured to send to the auxiliary remote device 30 the values of the characteristic parameters of the wheel alignment of the vehicle. In this embodiment, the signals related to the characteristic parameters measured by the measuring devices 10 are processed by the control unit 21 of the portable remote device 20: the latter is then configured to send the values of the characteristic parameters directly to the auxiliary remote device 30, hence reducing the computational burden on the auxiliary control unit 31 of the auxiliary remote device 30.

In an alternative embodiment, the portable remote device 20 is configured to send the signals related to the characteristic parameters of the wheel alignment measured by the measuring devices 10 to the auxiliary remote device 30: in this case the computational burden of processing said signals to obtain the values of the characteristic parameters is on the auxiliary control unit 31 of the auxiliary remote device 30.

In accordance with embodiments in which the auxiliary remote device 30 is wirelessly connected with the portable remote device 20, the latter may be configured to send to the auxiliary remote device 30 a command to emit the sound by means of the loudspeaker 35 and/or the vibrational signal by means of the vibrodine 36: in other words, in this case, the portable remote device is configured to send solely a signal to activate and deactivate the loudspeaker 35 and/or the vibrodine 36, while the step of comparing the measured value of the characteristic parameter and the corresponding reference value is carried out by the control unit 21 of the portable remote device.

In accordance with an additional embodiment, the auxiliary remote device 30 may be wirelessly connected directly to the measuring devices 10, which are configured to send the signals related to the characteristic parameters of the wheel alignment to the control unit 31 of the auxiliary remote device 30: in this case as well, the control unit 31 of the auxiliary remote device 30 is configured to process the related signals and obtain the values of the characteristic parameters of the wheel alignment of the vehicle 1.

The diagnosis system 100 may further provide an embodiment comprising a fixed remote device, not shown in the accompanying figures, defined for example by a desktop computer, and by a related screen connected to the fixed remote device. In other words the fixed remote device defines a fixed control station comprising the fixed remote device, the screen, and a support, for example a desk: said fixed control station thus is not easily transportable by an operator. In this embodiment the dimensions of the screen are greater than those of the screen 23 of the portable remote device 20: in particular, the dimensions of the screen of the fixed remote device are between 17" and 50", in particular between 20" and 30". The screen of the fixed remote device is configured to display the same characteristic information previously described in relation to the portable remote device 20. Additionally, the fixed remote device comprises a power supply system configured to connect to the general electric grid by means of a physical cable.

Therefore, as specified, this fixed control station cannot be moved into the work area 200 during its operation. The fixed remote device further comprises a controller and a wireless communication device, connected with the controller, configured to receive the signals related to the characteristic parameters of the wheel alignment from the measuring devices 10. The controller of the fixed remote device is then configured to process said related signals and to derive the values of the characteristic parameters of the wheel alignment.

In this embodiment, the diagnosis system 100 comprises the auxiliary remote device 30, connected wirelessly to the fixed remote device, and configured to receive the values of the characteristic parameters of the wheel alignment derived by the controller. Additionally or alternatively, the fixed remote device is configured to send to the auxiliary remote device 30 a command to emit the sound by means of the loudspeaker 35 and/or a vibrational signal by means of the vibrodine 36. In particular, as described previously, the fixed remote device may be configured to command the auxiliary remote device to change intensity and/or frequency of the sound and/or of the vibrational signal as a function of a value of a characteristic parameter of the wheel alignment or of its difference with respect to a corresponding reference value.

The position assumed by the operator 203 during mechanical adjustment operations of the wheel alignment of the vehicle is defined as the operating area 201 (see FIG. 9) internal to the work zone 200: during these operations, the portable remote device 20 is positioned in proximity to said operating area 201: the remote device 20 may be engaged to a metal structure 2020, for example to a vehicle lift used during vehicle servicing. A distance interposed between the portable remote device 20 and the operating area 201 of the work zone 200 occupied by the operator 203 is less than 3 meters, in particular less than 2 meters, still more in particular less than 1.5 meters.

The diagnosis system 100 provides that the operator 203, when in said operating area 201 and while being able to act on the vehicle alignment, is also able to display the screen 23 of the remote device 20, so as to facilitate and speed up the operations for the mechanical adjustment of the characteristic parameters of the wheel alignment of the vehicle. The operator 203, being near to its own portable remote device 20, can operate continuously on the vehicle with no need go back and forth for example to watch the screen of a fixed work station. Additionally, if the operator 203 needs to move to a different operating area 201 of the work zone 200 to carry out additional operations on the vehicle, he can reposition the portable remote device 20 so as to be able to continue to easily display the data related to the characteristic parameters during the mechanical adjustment operations.

The distance between operator 203 and portable remote device 20 previously indicated further allows the operator to easily see any image and/or hear any sound or vibrational signal emitted by the remote device 20: hearing or perceiving respectively the sound and vibrational signal emitted by the remote device allows the operator to understand whether the current mechanical adjustment operations he/she is carrying out on the vehicle are headed in the correct direction, i.e. to reduce the difference between the value of a measured characteristic parameter and a corresponding reference value. Additionally, the fact that intensity and/or frequency of these signals may be a function of the change over time of the difference between measured value and reference value, allows the operator to readily realize if the adjustment operation is headed in the correct direction, with not even the need to move the eyes from the wheel.

The diagnosis system 100 may further comprise a wall-mounted support 40, shown schematically in FIG. 5, configured to be fastened to a wall of a work zone 200 and to bear at least one measuring device 10 during a stand-by condition thereof: in particular each measuring device 10 is supported by the wall-mounted support when the measuring device 10 does not have to be used by the operator 203 to carry out the operation of measuring the characteristic parameters. The wall-mounted support, preferably made of metallic material or of plastic or composite material, is fastened to the wall of the work zone by means of one or more wall anchors, for example by means of one or more wall screws. Moreover, the wall-mounted support 40 and the measuring devices 10 comprise engaging means configured to allow mutual coupling: in detail these engaging means may comprise a support bracket or a magnet.

The wall-mounted support 40 further comprises a power supply circuit having a power supply plug 41 configured to be connected to the general electric power grid of the work area 200, and one or more charging stations electrically connected to the power supply plug 41. The measuring device 10, when carried by the wall-mounted support 40, is thus configured to connect operatively to a charging station of the wall-mounted support 40 to determine the charging of its own battery 14.

The wall-mounted support 40, the portable remote device 20 and optionally the auxiliary remote device 30 comprise engaging means configured to allow mutual coupling: these engaging means comprising for example a support bracket or a magnet.

The wall support 40 is further configured to bear the portable remote device 20 and optionally the auxiliary remote device 30 during a stand-by condition thereof: in this condition the portable remote device 20 and the auxiliary remote device 30 are configured to connect operatively to a charging station to determine the charging of their own battery 24, 34.

The charging stations of the wall-mounted support 40 may comprise a charging plug to connect to a charging cable intended to connect with the measuring devices 10, with the portable remote device 20 or with the auxiliary remote device 30. Alternatively, the charging stations of the wall-mounted support 40 may comprise an induction charging base configured to supply power, during the stand-by condition, to the measuring device 10, the portable remote device and the auxiliary remote device 30.

As shown in FIG. 5, the diagnosis system 100 comprises a first and a second wall-mounted support 40', 40", mutually distinct and separate and configured to be fastened each to a wall of the work area: the first and the second wall-mounted support 40', 40" are, similarly to what has just been described, configured each to carry the respective measuring devices 10 and to allow their charging. Preferably the wall-mounted supports 40', 40" are positioned on mutually opposite walls, so that the first support 40' is positioned on the left side of the vehicle and the second support 40" is positioned on the right side of the vehicle: in this way, the operator is facilitated during the set-up operations, in particular during a step of mounting the measuring devices 10 on the wheels of the vehicle. In this regard, the first and the second wall-mounted support 40', 40" are configured to house two measuring devices each.

Figure 7:
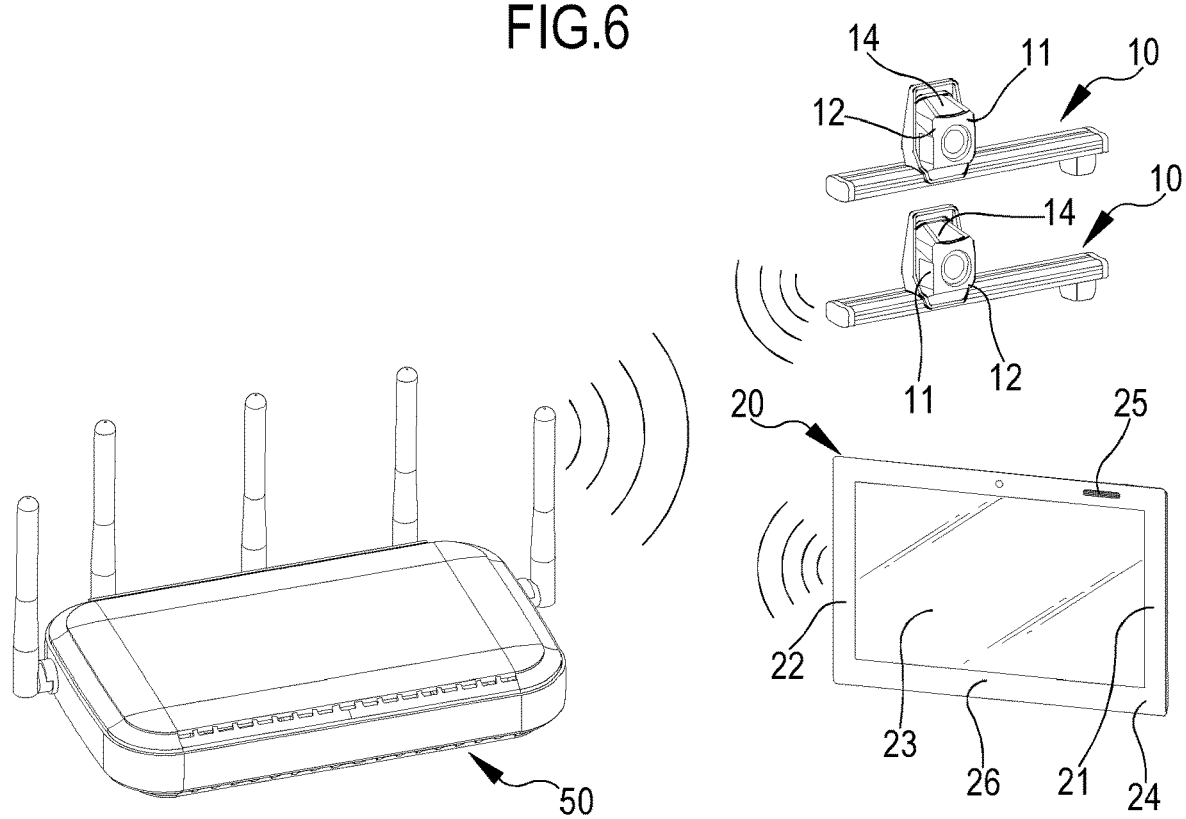
FIG. 7 is an overall view of the diagnosis system according to an embodiment of the present invention.

The diagnosis system may further comprise a wireless access point 50, schematically shown in FIG. 7, electrically connected to the general electrical power grid or to the power supply circuit of the wall-mounted support and configured to be wirelessly connected to the measuring device 10 and to the portable remote device 20. In addition, the wireless access point 50 may connect to the auxiliary remote device 30. The wireless access point 50 thus defines a bridge between the measuring devices 10 and the portable remote device 20 and/or auxiliary remote device 30: in this case, therefore, the portable remote device 20 and the auxiliary remote device 30 are connected with the measuring devices 10 indirectly by means of the access point 50.

Use of the Diagnosis System

The present solution further relates to a use of the diagnosis system 100 described previously.

The use of the diagnosis system by an operator 203 at a work area 200 comprises at least the following steps:
- providing at least one measuring device 10 at the vehicle 1 or fastening at least one component of the measuring device 10 and at least one wheel 2 of the vehicle 1;
- measuring, by means of the measuring device 10, at least one characteristic parameter of the wheel alignment of the vehicle;
- providing or fastening the portable remote device 20 adjacent to an operating area 201 of the work zone 200; the operating area 201 is defined at or closely near the position taken by the operator 203 during a step of mechanical adjustment of the wheel alignment of the vehicle 1; and
- displaying on the screen 23 of the portable remote device 20 the characteristic information of the wheel alignment of the vehicle 1.

The use of the present diagnosis system 100 further provides for the operator 203 to be able display, staying at the operating area 201 of the work zone 200, the screen 23 and to be able to watch the information displayed thereon.

Additionally, the use of the diagnosis system 100 may comprise the step of removably engaging the portable remote device 20, by means of the magnetic structure 25, to a metallic structure 202, for example to the vehicle lift, adjacent to the operating area 201 of the work zone 200.

In use the distance between the portable remote device 20 and the operating area 201 of the work zone 200 occupied by the operator 203 is less than 3 meters, in particular less than 2 meters, still more in particular less than 1.5 meters.

The use of the present diagnosis system further comprises the step of transporting, by the operator 203, the portable remote device 20 into the work area during a step, or between two or more steps, of mechanically adjusting the wheel alignment of the vehicle 1. Subsequently or simultaneously to said step of transporting the portable remote device 20, the use provides for displaying the characteristic information of wheel alignment of the vehicle 1 on the screen 23.

In accordance with an additional embodiment, the use provides for wearing, by the operator 203, the auxiliary remote device 30, so that the operator 203 detects the sound, vibrational or, optionally, visual signal emitted by the auxiliary remote device 30 as a function of the value of the characteristic parameter of the wheel alignment of the vehicle 1.

In practice the operator may move to the operating area, removably attach (e.g., magnetically) the portable remote device 20 to a support (e.g. a lift) and then operate on the wheel adjustment means, while at the same time perceiving visually whether his/her adjustment operations are proper because the remote device would provide either visual indications and/or acoustic indications and/or vibrational indication function of whether or not the adjustment is going in the direction of correcting any possible difference between the value of the characteristic parameter under adjustment and its reference range.

The invention claimed is:

1. A method of diagnosing vehicle wheel alignment, the method comprising:
   providing at a vehicle a measuring device configured to measure a wheel alignment parameter, the measuring device comprising a wireless transmitter configured to remotely transmit a signal related to said wheel alignment parameter;
   positioning a portable remote device, physically separated from said measuring device, in an operating area at, or closely surrounding, a position taken by an operator during wheel alignment adjustment of the vehicle, the portable remote device comprising:
      a wireless receiver configured to receive said signal related to the wheel alignment parameter;
      a controller configured to process said received signal to obtain a value of said wheel alignment parameter;
      a screen configured to display a characteristic information item, representative of the obtained value of said wheel alignment parameter; and
      a battery supplying power to the wireless receiver, the controller and the screen; and
   physically adjusting wheel alignment of the vehicle while the screen of the portable remote device displays the characteristic information item representative of a value of said wheel alignment parameter obtained by the controller based on said signal received from the measuring device;
   wherein the measuring device comprises, for each side of the vehicle, at least one of:
      a camera, borne by a fixed structure, said signal being related to an image obtained by a camera and related to a wheel or to an optical target mounted on a wheel, and
      an inclination sensor mounted on a wheel, said signal being related to an angle of inclination measured by the inclination sensor with respect to a reference direction;
   and wherein the method comprises:
      processing said signal by the controller of the portable remote device to obtain the value of the wheel alignment parameter measured by the measuring device,
      defining a visually perceivable property of said characteristic information item based on said obtained value, and
      displaying said characteristic information item on said screen positioned at, or adjacent, the operating area to provide the operator with a display of the characterizing information item directly visible at the operating area.

2. The method of claim 1, wherein said characteristic information item comprises at least one of:
   a numerical representation of the value of the wheel alignment parameter,
   a chromatic indication representative of the value of the wheel alignment parameter,
   a schematic image of the vehicle associated with the wheel alignment parameter and representative of the value of the wheel alignment parameter, and
   a schematic image of at least one a respective wheel associated with the wheel alignment parameter and representative of the value of the wheel alignment parameter; and
   wherein said wheel alignment parameter comprises at least one of:
      a toe angle of a wheel of the vehicle;
      a camber angle of a wheel of the vehicle;
      a caster angle of a wheel of the vehicle;
      a thrust angle of the vehicle;
      an included angle; and
      an angle representative of a tilt of a kingpin of the vehicle.

3. The method of claim 1 comprising the following further steps executed by the controller of the portable remote device:
   receiving a reference value corresponding to the measured wheel alignment parameter,
   comparing the obtained value of the wheel alignment parameter with the corresponding reference value,
   as a function of said comparison, displaying on the screen of the portable remote device the characteristic information item, which comprises displaying a graphical indication representative of at least one of:
      a difference between the obtained value of the wheel alignment parameter and the corresponding reference value,
      a change of said difference over time,
      a ratio between the obtained value of the wheel alignment parameter and the corresponding reference value, and
      a change of said ratio over time.

4. The method of claim 3, wherein displaying on the screen of the portable remote device the characteristic information item comprises:
   changing a visually perceptible property of the graphical indication if the difference between the obtained value of the wheel alignment parameter and the corresponding reference value decreases or if the ratio between the obtained value of the wheel alignment parameter and the corresponding reference value tends to 1.

5. The method of claim 3, wherein displaying on the screen of the portable remote device the characteristic information item comprises accentuating a visually perceptible property of the graphical indication if the change of said difference over time is representative of a reduction of said difference, or if the change of said ratio over time is representative of a trend to 1 of said ratio.

6. The method of claim 3, wherein the portable remote device comprises a loudspeaker, and wherein the method comprises a step executed by the controller of the portable remote device of controlling, as a function of said comparison, said loudspeaker to emit an audible sound signal indicating at least one of:
a difference between the obtained value of the wheel alignment parameter and the corresponding reference value,
a change of said difference over time,
a ratio between the obtained value of the wheel alignment parameter and the corresponding reference value, and
a change of said ratio over time.

7. The method of claim 6, comprising increasing a frequency or volume of the sound signal if the difference between the obtained value of the wheel alignment parameter and the corresponding reference value decreases or if the ratio between the obtained value of the wheel alignment parameter and the corresponding reference value tends to 1.

8. The method of claim 6 comprising increasing a frequency or volume of the sound signal if the change of said difference over time is representative of a reduction of said difference, or if the change of said ratio over time is representative of a trend to 1 of said ratio.

9. The method of claim 3, wherein the portable remote device comprises a vibrator, and wherein the method comprises a step executed by the controller of the portable remote device of controlling, as a function of said comparison, said vibrator to emit a vibration indicative of at least one of:
a difference between the obtained value of the wheel alignment parameter and the corresponding reference value,
a change of said difference over time,
a ratio between the obtained value of the wheel alignment parameter and the corresponding reference value, and
a change of said ratio over time.

10. The method of claim 9 comprising increasing a frequency or amplitude of the vibration if the difference between the obtained value of the wheel alignment parameter and the corresponding reference value decreases, or if the ratio between the obtained value of the wheel alignment parameter and the corresponding reference value tends to 1.

11. The method of claim 9 comprising increasing a frequency or amplitude of the vibration if the change of said difference over time is representative of a reduction of said difference, or if the change of said ratio over time is representative of a trend to 1 of said ratio.

12. The method of claim 1, wherein the portable remote device comprises a support base and a magnetic or magnetizable structure secured to said support base, and wherein the step of providing the portable remote device comprises removably securing the portable remote device to a metallic structure.

13. The method of claim 1, wherein the portable remote device comprises an inclinometer in communication with the controller and responsive to inclination of the portable remote device, and wherein the process comprises the further step executed by the controller of establishing an orientation of the characteristic information item displayed on the screen based on the inclination of the portable remote device.

14. The method of claim 1, further comprising providing an auxiliary remote device, separate and distinct from the portable remote device and from the measuring device, the auxiliary remote device being wearable by an operator, wherein said auxiliary remote device comprises:
a wireless communication device configured to remotely communicate with at least one of the portable remote device and the measuring device,
an auxiliary controller connected operatively with the wireless communication device;
a battery; and
at least one of a loudspeaker and a vibrator; and
wherein the method comprises:
receiving by the auxiliary remote device the value of the wheel alignment parameter or a signal related to the wheel alignment parameter from the portable remote device or the measurement device, and
changing a sound signal emitted by the loudspeaker or a vibration emitted by the vibrator as a function of at least one of:
a difference between the obtained value of the wheel alignment parameter and the corresponding reference value,
a change of said difference over time,
a ratio between the obtained value of the wheel alignment parameter and the corresponding reference value, and
a change of said ratio over time.

15. The method of claim 14 comprising sending by the portable remote device a command, as a function of the value of the wheel alignment parameter or of a difference thereof with respect to the corresponding reference value and/or of a ratio thereof with respect to a respective reference value, to the auxiliary remote device, said command comprising at least one of:
a command to emit a sound signal variable as a function of the wheel alignment parameter;
a command to emit a vibration variable as a function of the wheel alignment parameter; and
a command to display a visual signal on a screen of the auxiliary remote device comprising a graphical indication of the at least one wheel alignment parameter.

16. The method of claim 1 wherein, at least during a step of mechanical adjustment of wheel alignment of the vehicle by an operator, a distance between the portable remote device and the operator is less than 1.5 meters.

17. A method of adjusting vehicle wheel alignment, the method comprising:
providing at a vehicle a measuring device configured to measure a wheel alignment parameter, the measuring device comprising a wireless transmitter configured to remotely transmit a signal related to said wheel alignment parameter;
positioning a portable remote device, physically separated from said measuring device, in an operating area at, or closely surrounding, a position taken by an operator during wheel alignment adjustment of the vehicle, the portable remote device comprising:
a wireless receiver configured to receive said signal related to the wheel alignment parameter;
a controller configured to process said received signal to obtain a value of said wheel alignment parameter;

a screen configured to display a characteristic information item, representative of the obtained value of said wheel alignment parameter; and a battery supplying power to the wireless receiver, the controller and the screen;

providing an auxiliary remote device, separate and distinct from the remote device and from the measuring device, the auxiliary remote device being wearable by an operator and comprising an auxiliary controller and a wireless communication device configured to remotely communicate with the remote device and/or with the measuring device, said auxiliary remote device further comprising at least one of a loudspeaker, a vibrator and a screen;

physically adjusting wheel alignment of the vehicle while the portable remote device sends a command, as a function of the value of the wheel alignment parameter, or of a difference thereof with respect to a respective reference value, or of a ratio thereof with respect to a respective reference value, to the auxiliary remote device, said command causing the auxiliary remote device to do at least one of:

emit a sound signal as a function of the wheel alignment parameter or information of wheel alignment;

emit a vibration signal as a function of the wheel alignment parameter or information of the wheel alignment; and display a visual signal on the screen indicative of the wheel alignment parameter.

18. The method of claim 17, further comprising wearing, by the operator, the auxiliary remote device while adjusting wheel alignment of the vehicle.

19. The method of claim 17 wherein, during adjustment of wheel alignment of the vehicle, the auxiliary remote device emits a varying signal perceptible by the operator and comprising at least one of:

an audible signal varying in intensity, an audible signal varying in frequency, a vibration varying in intensity, a vibration varying in frequency, and a visual signal visible on the screen and varying in color, shape, size or contour, the signal varying as a function of at least one of:

a difference between the at least one obtained value of the wheel alignment parameter and the respective reference value, a change of said difference over time, a ratio between the at least one obtained value of the wheel alignment parameter and the respective reference value, and a change of said ratio over time.

* * * * *